(12) United States Patent
Heshmat et al.

(10) Patent No.: US 6,353,273 B1
(45) Date of Patent: Mar. 5, 2002

(54) HYBRID FOIL-MAGNETIC BEARING

(75) Inventors: Hooshang Heshmat, Niskayuna; H. Ming Chen, Latham; James F. Walton, II, Ballston Lake, all of NY (US)

(73) Assignee: Mohawk Innovative Technology, Inc., Albany, NY (US)

( * ) Notice: Subject to any disclaimer, the term of this patent is extended or adjusted under 35 U.S.C. 154(b) by 0 days.

(21) Appl. No.: 09/153,513

(22) Filed: Sep. 15, 1998

(Under 37 CFR 1.47)

Related U.S. Application Data
(60) Provisional application No. 60/059,005, filed on Sep. 15, 1997.

(51) Int. Cl.$^7$ .............................. H02K 7/09; H02P 5/28; F16C 32/06
(52) U.S. Cl. ....................... 310/90.5; 318/799; 384/103
(58) Field of Search ............................. 310/90.5, 68 B; 318/610, 561, 799, 804; 384/103, 106, 117, 263, 267

(56) References Cited

U.S. PATENT DOCUMENTS

| | | |
|---|---|---|
| 4,262,975 A | 4/1981 | Heshmat et al. |
| 4,277,111 A | 7/1981 | Gray et al. |
| 4,277,112 A | 7/1981 | Heshmat |
| 4,277,113 A | 7/1981 | Heshmat |
| 4,296,976 A | 10/1981 | Heshmat |
| 4,300,806 A | 11/1981 | Heshmat |
| 5,084,643 A | 1/1992 | Chen |
| 5,133,527 A | 7/1992 | Chen et al. |
| 5,202,824 A | 4/1993 | Chen |
| 5,666,014 A | 9/1997 | Chen |
| 5,714,818 A * | 2/1998 | Eakman et al. ............ 310/90.5 |
| 5,818,131 A * | 10/1998 | Zhang ....................... 310/90.5 |
| 5,833,369 A | 11/1998 | Heshmat |
| 5,902,049 A | 5/1999 | Heshmat |
| 6,135,640 A | 10/2000 | Nadjafi |

FOREIGN PATENT DOCUMENTS

CA 2151687 12/1995

OTHER PUBLICATIONS

H. Heshmat et al, "Hybrid Foil–Magnetic Bearings," the 7$^{th}$ Nordic Symposium on Tribology (Nortrib'96), Bergen, Norway, Jun. 16–19, 1996.

* cited by examiner

Primary Examiner—Nestor Ramirez
Assistant Examiner—Dang Dinh Le
(74) Attorney, Agent, or Firm—James C. Simmons

(57) ABSTRACT

A method for bearing a rotor in which load is shared between a foil bearing part and a magnetic bearing part without using a calculated rotor trajectory corresponding to various rotor spin speeds. Power input to the magnetic bearing part is controlled in response to feedback of rotor position. In order to share the load on the fly so that the load is shared quickly as the rotor speed is changed, the power input is modified in response to rotor spin speed to reduce load capacity of the magnetic bearing part as rotor spin speed is increased and increase load capacity of the magnetic bearing part as rotor spin speed is decreased. Alternative methods of modifying power input include modifying integral gain and inputting rotor spin speed to an adaptive filter to continually reset the adaptive filter at the rotor spin speed. For use of the process with a thrust bearing, the magnetic and foil bearing parts are disposed on opposite sides of the thrust runner.

7 Claims, 16 Drawing Sheets

| FIG. 14A | FIG. 14B |

HYBRID FOIL-MAGNETIC BEARING

The present application claims priority of U.S. provisional patent application Ser. No. 60/059,005, filed Sep. 15, 1997, which application is hereby incorporated herein by reference.

The present invention relates generally to bearings.

Foil bearings, such as disclosed in U.S. patent application Ser. Nos. 08/827,203 and 08/827,202, assigned to the assignee of the present invention, and U.S. Pat. Nos. 4,262,975; 4,277,113; 4,300,806; 4,296,976; 4,277,112; and 4,277,111 of Hooshang Heshmat (either as sole or as joint inventor), an inventor of the present invention, which applications and patents are incorporated herein by reference, include a sheet positioned to face a shaft portion for relative movement there between and means in the form of a corrugated shape having a plurality of ridges or other suitable form for resiliently supporting the sheet thereby defining a compliant hydrodynamic fluid film bearing. The bearing may be a journal bearing in which case the sheet is in surrounding relation to a shaft for relative rotational movement there between or a thrust bearing in which case the sheet bears a rotating shaft runner. Stiffness and damping are provided in a foil bearing by the smooth top foil or sheet and structural support elements which are suitably designed to provide a compliant spring support of the desired stiffness (or stiffness which is variable with load) and damping and by the hydrodynamic effects of a gas film between the shaft and the smooth top foil.

Magnetic bearings, such as disclosed in U.S. patent application Ser. No. 09/046,334, which is assigned to the assignee of the present invention, and in U.S. Pat. Nos. 5,084,643; 5,133,527; 5,202,824; and 5,666,014 of Hsaing Ming Chen (either as sole or as joint inventor), an inventor of the present invention, which applications and patents are incorporated herein by reference, include magnet means on a housing which magnetically interact with a shaft portion for adjusting the position thereof during rotation thereof. A magnetic bearing may be provided as either a journal or a thrust bearing.

Magnetic bearings may be classified as using either repulsive or attractive forces. Repulsive force systems often use permanent magnets while attractive force systems usually use electromagnets. Attraction electromagnets are usually used for magnetic suspension systems (bearings) since stiffness nearly comparable to rolling element bearings can be achieved and since active control permits variation of parameters as dictated by rotor system dynamics. An actively controlled magnetic bearing generally comprises a stator which is wound with coils to create the magnetic field and ferromagnetic laminations mounted on the rotor to interact with the stator magnetic field.

Position sensors provide feedback for control of magnetic bearings. Bias currents are conventionally applied to the electromagnets to support static loads and set up an operating flux field for linearized control. Since the flux field is equivalent to a negative spring, the bearing is inherently unstable. For reliable rotor control, both rotor position and its rate of change need to be corrected. In other words, the active magnetic bearing needs damping or velocity control, which is achieved by adding rotor velocity feedback to the current control. The rotor velocity is generally estimated from the displacement measurements through the use of a differentiator, phase-lead circuit, or state observer. In addition to dynamic stiffness and damping, basic rotor position error feedback is required to statically center the rotor. A typical magnetic bearing control is thus a gain and phase compensation network which provides a summation of (1) the time-varying position signal for dynamic stiffness control (which may be called "Proportional"), (2) the integral of the position signal error for static stiffness control (which may be called "Integral"), and (3) the derivative of the time-varying position signal for damping (which may be called "Derivative"). High static stiffness is provided to keep the rotor centered in the bearing. With independent control of each of these elements, the controller, which may resultingly be called a "PID controller", allows the magnetic bearing characteristics to be varied as a function of machine operation. Lead-lag or notch filter circuits are added to the PID circuit to allow gain and phase compensation at resonant frequencies not covered by the PID circuit. Common rotordynamic controls include varying the bearing stiffness to alter lateral vibration modes, inserting damping to reduce dynamic motion, and generating rotating bearing forces to oppose or cancel rotor unbalance and harmonic forces.

The mechanical simplicity of foil bearings makes them suitable for high-speed machines such as those with cryogenic turbo-rotors with both expander and compressor wheels running at tens of thousands rpm. However, a significant effort is required to design a set of foil bearings for any new application. Furthermore, foil bearings do not lift off at low speed, thus requiring a coating on the foil for protection thereof at low speeds during start-ups and shut-downs. To make a long-lasting coating, uniform foil surface compliancy must be provided by design. Moreover, it is not easy to design an adequate amount of coulomb damping in the foil bearing crucial for rotor stability at high speeds.

Active magnetic bearings are considered to be well suited for low speed operations due to there being no metal contact, dynamic softness, and electronically maneuverable stiffness and damping. However, active magnetic bearings are vulnerable to rotor bending or structural resonances, due to non-collocation of sensors and actuators (not in same location axially as bearing center), which can easily saturate power amplifiers and make the control system unstable. Furthermore, it is difficult to provide reliable and long-lasting back-up bearings for active magnetic bearings. Conventional rolling-element type back-up bearings tend to have skidding wear and last for only a few rotor drops due to electric failures. Moreover, violent backward whirl may occur to render a rotor-bearing failure a disaster. However, some progress is being made to provide improved back-up bearings.

Since the foil bearing is considered to be advantageous for high speed operation and the magnetic bearing for low-speed operation, it is considered advantageous to combine them into a hybrid bearing having the advantages of each. The hybrid journal bearing is considered to provide, for some applications such as aircraft gas turbines, the following benefits. Since the specific capacity of a foil bearing is typically about 500 lbs. per lb. of bearing weight and since that of the active magnetic bearing is typically about 40 lbs. per lb. of bearing weight, the hybrid bearing should be much smaller, lighter in weight, and consume less power than a pure active magnetic bearing, for the same load capacity. The rotor may coast down safely on the foil bearing part in case of electric power loss to the magnetic bearing part. The foil bearing coating wear problem is no longer a problem because the magnetic bearing part can take the load at low speeds. Sub-synchronous stability can be enhanced by electronically generated damping of the magnetic bearing part. Sub-synchronous stability may be enhanced by electronically tuning the controller transfer function to obtain desirable system dynamics. The tuning of the magnetic bearing part in high frequency range may be simplified because the rotor is supported by the foil bearing part with Coulomb damping. The ability to independently vary bearing characteristics, provided by the active magnetic bearing, offers versatile rotor control. With the employment of an active magnetic bearing part, rotor speed has no direct effect of the load capacity.

It is therefore considered desirable to provide a suitably controllable hybrid journal bearing. However, there is an eccentricity of the foil bearing part, as seen in FIGS. 3 and 4, which is discussed hereinafter, which would seem to be incompatible with the lack of such eccentricity in a conventional magnetic bearing. Thus, these eccentricity differences, wherein the natural rotational center of a rotor within a magnetic bearing would be different from its natural rotational center within a foil bearing, would seem to rule out a hybrid use of both a foil bearing part and a magnetic bearing part.

If a hybrid journal bearing were to comprise magnetic control coils on opposite sides of the bearing, this would thus provide right and left magnetic planes. For a large load capacity, a foil journal bearing tends to have a length to diameter ratio close to 1. This would make the hybrid journal bearing long in the axial direction with the result that an undesirably large bending mode node could exist inside the hybrid bearing. If all four bearing coils (quadrants 1 and 3, both right and left magnetic planes, for vertical control; or quadrants 2 and 4, both right and left magnetic planes, for horizontal control) for control in one direction (vertically or horizontally) were connected to be actuated with one bi-polar power amplifier to achieve a push-pull control action, sensor non-collocation may undesirably cause the magnetic bearing actuator to produce forces which are improperly phased with respect to the shaft motion that is to be controlled.

The benefits of a hybrid foil-magnetic thrust bearing are considered to be similar to those of a hybrid foil-magnetic journal bearing. Thus, the hybrid thrust bearing for high-speed and high-temperature applications would carry more load per pound of bearing weight than a conventional thrust active magnetic bearing. The hybrid thrust bearing would have superior dynamic characteristics because the foil part, inherently a high speed bearing part, and the magnetic part, which with solid cores performs well at low frequencies, would tend to complement each other. The foil part, since it would not take up any load at start-ups and shut-downs, would not need a coating or its coating, if provided, should last a long time. Furthermore, at high speeds, the foil part would be able to take over and prevent bearing catastrophe in case of electric or control failures.

At the operating speed, the load on a thrust bearing varies from a minimum or normal thrust load to a maximum due to, for example, a compressor surge. The hybrid thrust bearing should be able to take any load amount within its capacity without "thinking" (performing off-line logic calculations and making decisions in a supervising controller to re-set parameters) since there may not be enough time to do the "thinking".

It is accordingly an object of the present invention to provide a suitably controllable hybrid foil-magnetic bearing.

It is another object of the present invention to provide control of a hybrid foil-magnetic journal bearing which is substantially free of the effects of a bending mode node resulting from magnetic planes on opposite sides of the bearing and of sensor non-collocation.

In accordance with the present invention, there is provided a suitably controllable hybrid foil-magnetic journal bearing wherein the foil and magnetic bearing parts share the load at a predetermined speed. In accordance with one embodiment thereof, foil and magnetic bearing stiffnesses are continuously re-calculated and new reference eccentricities established therefrom and inputted to a controller to thereby provide control of steady state load sharing in the bearing wherein the control reference of the magnetic bearing part follows the eccentricity of the foil bearing part. In accordance with another embodiment thereof, an adaptive filter is provided to filter out vibration signals at the frequency coincident with the rotor speed from control current so that the control current need not be re-calculated at different rotor spin speeds and, thus, so that load sharing may be achieved quickly without "thinking." Alternatively, the integral control coefficient may be selected such that the magnetic part static stiffness is reduced, preferably gradually, at increased rotor speed or speeds thereby allowing the rotor center to "seek" the foil bearing part center at the respective rotor speed so that load-sharing may be achieved automatically or without "thinking."

In order to provide control of the journal bearing which is substantially free of the effects of a bending mode node resulting from magnetic planes on opposite sides of the bearing and of sensor non-collocation, in accordance with the present invention, for each axis (vertical and horizontal), a first signal is outputted, in response to input of the shaft radial position from a first sensor on a first side of the bearing housing, to a first control coil means for regulating flux on the first side of the housing, and a second signal is outputted, independently of the outputting of the first signal, in response to input of the shaft radial position from a second sensor on a second side of the bearing housing, to a second control coil means for regulating flux on the second side of the housing.

In order to provide a suitably controllable hybrid foil-magnetic thrust bearing, in accordance with the present invention, the foil bearing and magnetic bearing parts are located on opposite sides of the thrust runner for sharing the load. In accordance with one embodiment, control current is re-calculated as rotor speed changes. Alternatively, the integral gain may be selected such that, regardless of rotor speed, the control current will not need to be re-calculated at different rotor speeds so that load-sharing may be achieved automatically and thus quickly without "thinking."

The above and other objects, features, and advantages of the present invention will be apparent to one of ordinary skill in the art to which the present invention pertains in the following detailed description of the preferred embodiments of the present invention when read in conjunction with the accompanying drawings wherein the same reference characters denote the same or similar parts throughout the several views.

DETAILED DESCRIPTION OF A PREFERRED EMBODIMENT

Figure 1:
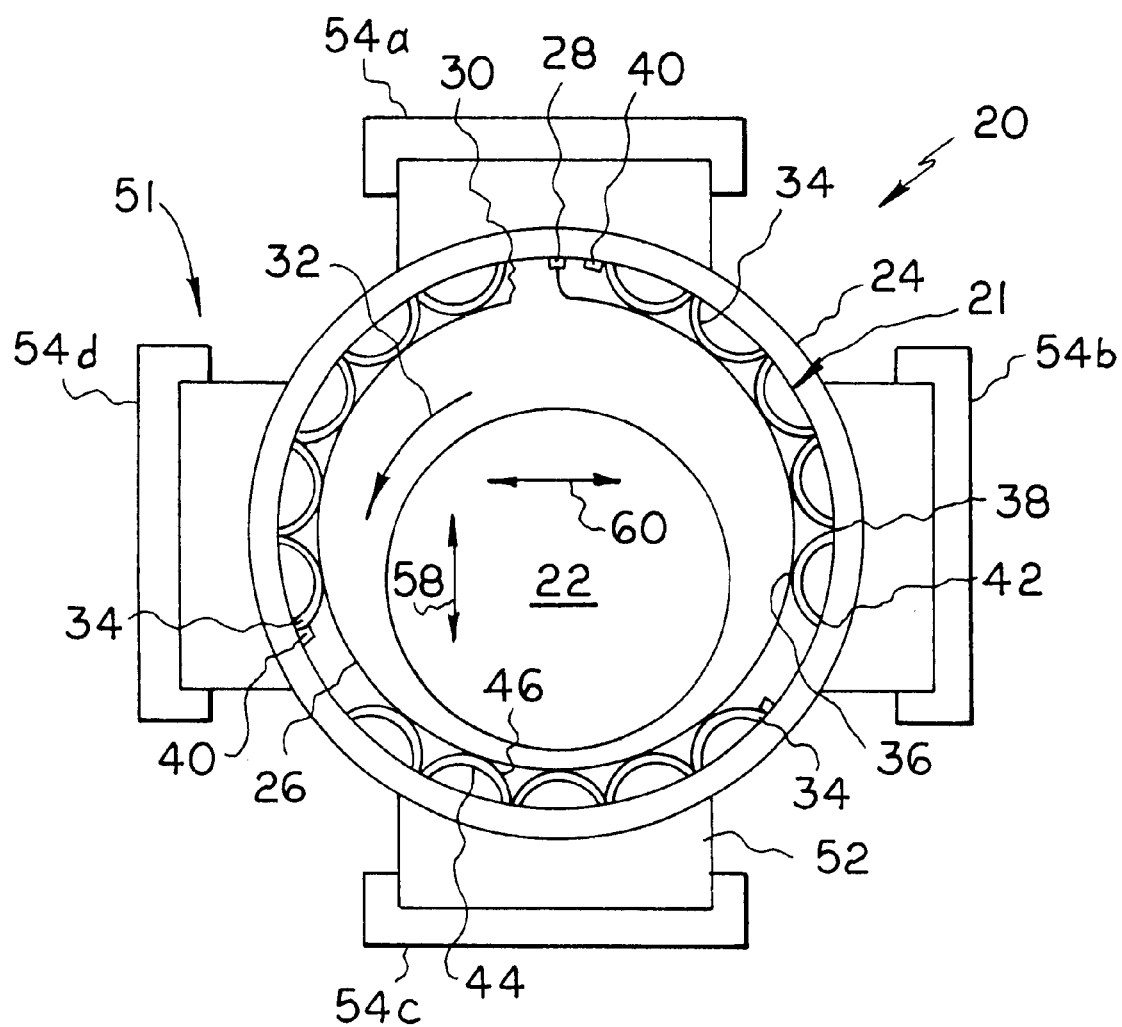
FIG. 1 is a schematic side view of a hybrid foil-magnetic journal bearing which embodies the present invention.
Figure 2:
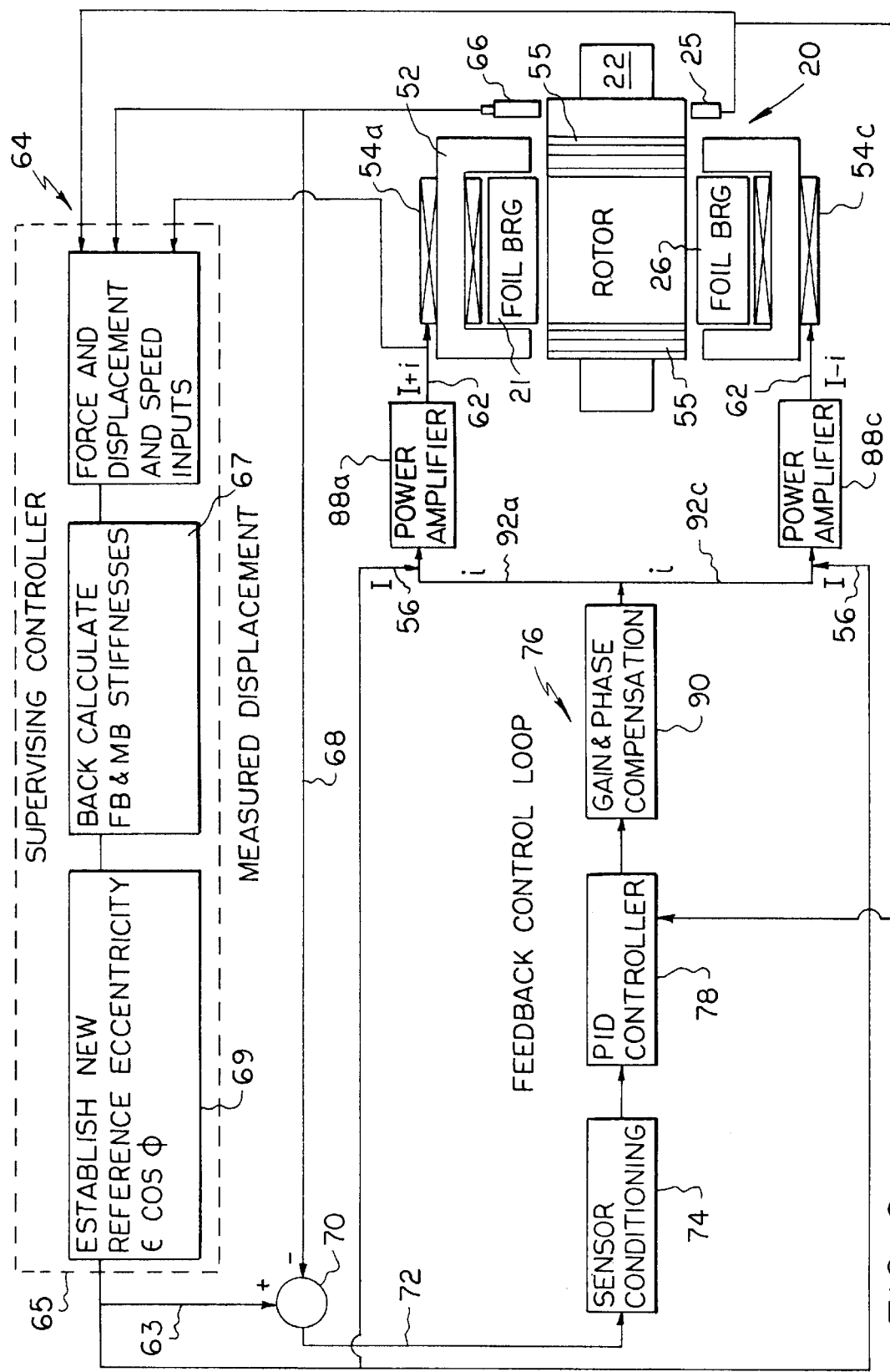
FIG. 2 is a schematic view illustrating a control system for the bearing.

Referring to FIGS. 1 and 2, there is illustrated generally at 20 a hybrid foil-magnetic journal or radial bearing for rotatably receiving a rotor or shaft 22 (the shaft being shown with an exaggerated small diameter, it being understood that the shaft diameter approaches that of the bearing, i.e., the clearance typically being only on the order of thousandths of an inch). The bearing 20 includes a generally cylindrical housing 24 which receives the rotor 22. A foil bearing means or part 21 includes a suitable thin flexible smooth sheet or foil 26 which is disposed between the housing 24 and the rotor 22 and faces the rotor 22. One edge of the foil 26 is suitably anchored to the housing 24 as at suitable anchoring means 28 and extends therefrom substantially circumferentially around the rotor 22 and terminates in a free or trailing edge 30. The rotor 22 is illustrated in FIG. 1 to rotate counterclockwise, as illustrated at 32. Disposed between the housing 24 and the foil 26 are a series of, for example, three circumferentially spaced elements or sheets 34 each having a corrugated shape to define a plurality of circumferentially spaced ridges 36 to engage the foil 26 and a corresponding plurality of circumferentially spaced troughs 38 to engage the housing 24 to thereby provide a compliant spring support for the foil, i.e., resiliently bear or support the foil 26. The leading edges of the corrugated supports 34 are anchored to the housing 24 as by anchoring means 40, and the supports 34 extend therefrom circumferentially to trailing free edges 42.

Elastic deflection of the foil 26 generates load-carrying hydrodynamic films. As speed increases, the foil 26 and corrugated support sheets 34 are automatically forced radially outward, forming a converging wedge, which is an optimum shape for the desired hydrodynamic action and which is achieved without the need for complex and expensive machining. Converging or lobing effects due to the bumps or ridges 36 become more pronounced as a function or speed and load thereby increasing bearing load capacity. The self-generated lobing effects also assist in enhancing rotor system stability through a reduction in cross-coupled stiffness and increased damping. The compliant surface readily accommodates shaft centrifugal growth with minimal loss of load capacity and without increased load complexity.

The corrugated supports may be constructed to provide the bearing stiffness needed to meet specific system dynamic requirements. For example, the corrugated supports 34 are illustrated in FIG. 1 to comprise a nested or double bump configuration which includes an outer corrugated sheet 44 and an inner corrugated sheet 46, which configuration is provided to achieve stiffness that varies with load. Such variable stiffness is provided to extend the operating range of a foil bearing. Low stiffness, provided by only the ridges 36 of the inner corrugated support 46 supporting the foil 26 when forces acting on it are low, aids in developing a converging wedge quickly causing film pressures that will lift the rotor off the foil 26 quickly at low speeds. At high speeds, the higher generated gas film pressures may require the stiffer supporting structure provided when the higher forces cause the ridges 36 of the inner corrugated sheet 46 to be engaged by the ridges 36 of the outer corrugated sheet 44 to accommodate the operating loads such as those due to rotor imbalance. Since, as will be discussed hereinafter, the load will normally be borne by magnetic means at start-up and low speeds, it may not be considered necessary to have the low stiffness in which case a single high stiffness corrugated support sheet may be provided. However, it still may be desirable to have low stiffness as a back-up.

The foil bearing part 21, comprising the foil 26 and its supports 34, may be constructed in various other ways, taking into consideration the particular requirements of the system being developed. For example, an individual foil may be provided for each of the corrugated supports 34, or a single corrugated support may be provided for the foil 26. For another example, the foil support structure may comprise a plurality of circumferentially extending side-by-side rows each having a plurality of corrugated elements wherein ends of the elements in each row is offset circumferentially from ends of the elements in adjacent rows symmetrically from the radial centerplane of the bearing assembly to thereby provide a herringbone pattern effect, as described in the aforesaid U.S. patent application Ser. No. 08/827,203, which is incorporated herein by reference, for enhancing the self-pumping action of the bearing. Various other foil bearing constructions which may be incorporated, as suitable, in the bearing of the present invention are disclosed in the patents and patent applications incorporated by reference relative to foil bearings.

The hybrid bearing 20 also includes a magnetic bearing means or part 51 which comprises a stator 52 wound with coils 54 to create a magnetic field and ferromagnetic laminations, illustrated at 55, on the rotor 22 to interact with the stator magnetic field to effect movement of the rotor 22 radially in the direction in which the magnetic field applies force for movement of the rotor 22. Thus, a first pair of the coils 54a and 54c are diametrically opposite each other for effecting movement of the rotor 22 in a first direction, illustrated at 58, such as vertically, and a second pair of the coils 54b and 54d are diametrically opposite each other in a plane at right angles to the plane of the first pair for effecting movement of the rotor in a second direction, illustrated at 60, such as horizontally, which is normal to the first direction 58. Bias currents, illustrated at 56, are applied to the coils 54 to support static loads and set up an operating flux field for linearized control. The bias currents 56 form a flux field equivalent to a negative spring with the result that the bearing 51 is inherently unstable and must be stabilized to function suitably. Stability is established by a negative feedback control of the rotor displacements wherein control currents, illustrated at 62, are provided to modulate the bias currents 56 to create stiffness and damping and to create the desired stability.

The magnetic bearing part 51 may be constructed in various other ways, taking into consideration the particular requirements of the system being developed. For example, while the bearing part 51 is illustrated as being homopolar, it should be understood that it may have a heteropolar configuration. Various other constructions are disclosed in the patents and patent application incorporated by reference relative to magnetic bearings.

While the hybrid bearing 20 is illustrated in FIG. 2 to be of a nested configuration wherein the foil part 21 is embedded within the magnetic part 51, it should be understood that the hybrid bearing 20 may be otherwise suitably configured such as, for example, wherein the foil part 21 is placed outside/beside the magnetic part 51, or, for another example, wherein the magnetic part 51 is placed on one or both sides of the foil part 21.

FIG. 2 illustrates a control system 64 for the pair 54a and 54c of coils for vertical control, it being understood that a similar control system is provided for the horizontal control coils 54b and 54d. A position sensor 66 is suitably disposed to provide rotor position in the respective magnetic plane, i.e., vertically for coils 54a and 54c, it being understood that a horizontal position sensor is provided for coils 54b and 54d. It should however be understood that other forms of rotor position sensing (directly or indirectly) may be provided such as, for example, flux feedback within the gap between the rotor and the magnetic bearing poles. Sensor 66 provides a signal of measured rotor displacement in the respective direction (vertically for coils 54a and 54c) via line 68 to summer 70 where this signal is combined with a reference, i.e., the desired rotor position at that point in time, which is inputted thereto from a supervising controller 65 via line 63. The resulting summed signal is then transmitted via line 72 to a sensor conditioner 74 of a feedback control loop 76. The purpose of the sensor conditioner 74 is to establish the dynamic motion or displacement of the rotor and provide a suitable signal for a PID (proportional, integral, and derivative control) controller 78 to which the conditioned signal is then sent. An input to P (proportional), illustrated at 80 in FIG. 14 (the controllers in FIGS. 2 and 14 being identical), of controller 78 for dynamic stiffness control is the time varying position signal, illustrated at X in FIG. 14. Control currents based solely on rotor position, while providing dynamic stiffness control, are considered to be inadequate alone to control the rotor at resonances or critical speeds. For reliable rotor control, it is considered that both rotor position and its rate of change need to be corrected. Thus, damping or velocity control, which is achieved by adding rotor velocity feedback to the current control, is also considered to be needed. In addition to dynamic stiffness and damping, basic rotor position error feedback is also considered to be required to statically center the rotor. The controller 78 is thus provided to sum in summing circuit 86 the proportional signal 80 for dynamic stiffness control, the integral, I, of the position signal error, illustrated at 82, for static stiffness control, and the derivative, D, of the time-varying position signal, illustrated at 84, for damping, in accordance with principles commonly known to those of ordinary skill in the art to which this invention pertains, and to output the signal of the summed information via lines 92a and 92c to power amplifiers 88a and 88c for coils 54a and 54c respectively after being suitably gain and phase compensated, as illustrated at 90. The signal i is added to bias current I for delivery to one of the coils 54a and subtracted from the bias current I for delivery to the other coil 54c for increasing the flux from one coil and decreasing the flux from the other coil for effecting a movement in the desired direction radially vertically of the rotor 22. The respective signals are amplified in amplifiers 88a and 88c before passing to the respective coils. The feedback control circuitry as so far described with reference to FIG. 2 is conventionally known in the art and is described and illustrated in the aforesaid U.S. Pat. Nos. 5,202,824 and 5,084,643 which, as previously discussed, are incorporated herein by reference. Since a PID controller as well as its use is conventionally known in the art, it will not be described in further detail herein. It should however be understood that other suitable control means may be employed such as, for example, state space, non-linear, adaptive, and/or fuzzy logic control methods.

For operation of the hybrid bearing 20, it is preferably controlled so that the magnetic bearing part 51 initially centers the rotor 22 to eliminate rubbing between the foil 26 and rotor 22 during low speeds and start-up, then release the load gradually to the foil bearing part 21, and provide synchronous balancing forces and additional damping for enhanced high speed stability while a share (or all) of the load is taken by the foil bearing part 21.

Figure 3:
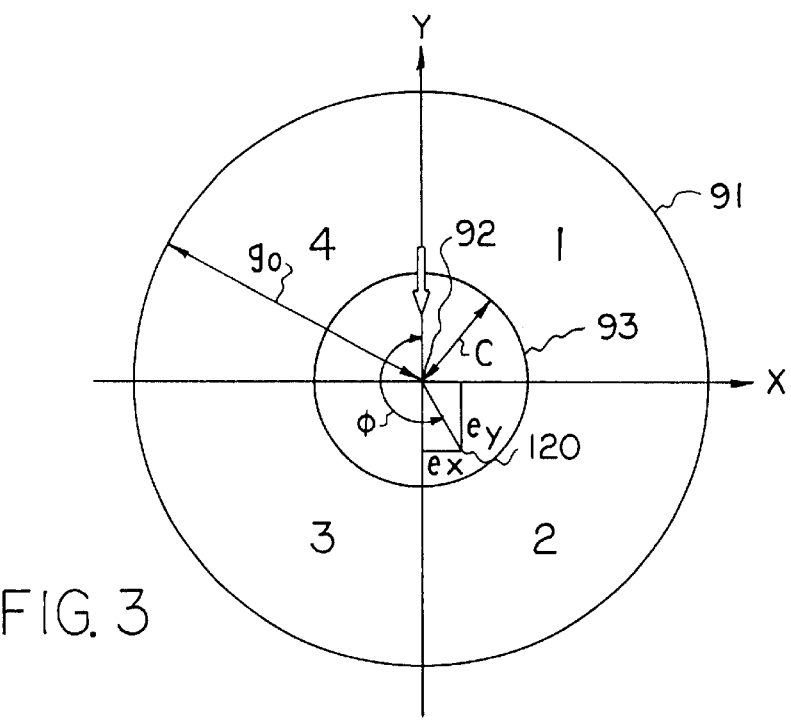
FIG. 3 is a graph illustrating a change in bearing eccentricity.
Figure 4:
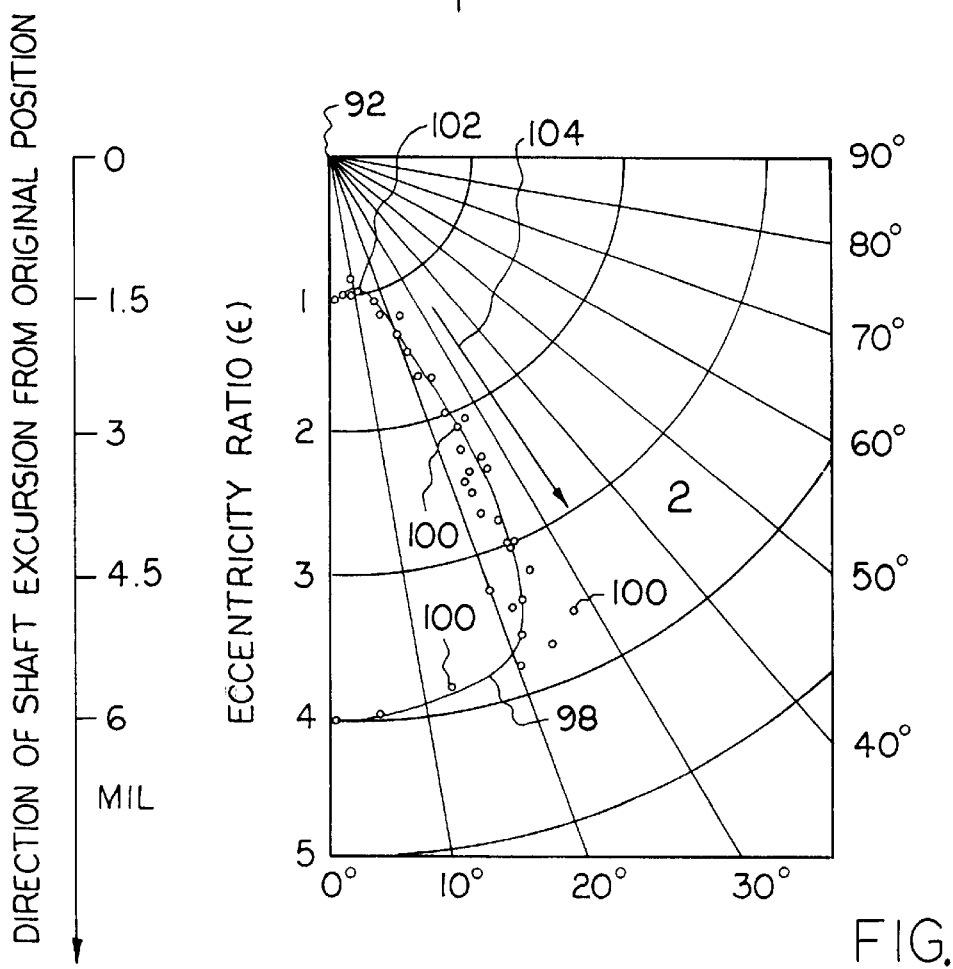
FIG. 4 is a graph of quadrant 2 of FIG. 3 illustrating change in bearing eccentricity as speed increases.

FIG. 3 illustrates the 4 quadrants 1, 2, 3, and 4 within the magnetic bearing clearance circle 91 with the center illustrated at 92, the foil bearing clearance circle being shown at 93, i.e., being smaller than the magnetic bearing clearance to prevent contact between the rotor 22 and the stator laminations 55, and FIG. 4 is an enlarged view of quadrant 2.

High static stiffness provided by the magnetic bearing part 51 keeps the rotor 22 centered within the bearing 20, i.e., with its center at center 92. The dynamic stiffness of a magnetic bearing can be represented by the following equation in a normalized form for the PID control system 78:

$$K/K_m = (G_p G_a K_i/K_m)[C_p + C_i/(\tau_i S+1) + C_d S/(\tau_d S+1)] - 1$$

where
    K=magnetic bearing stiffness, lb/in
    $K_m$=magnetic stiffness, lb/in, function of bias current
    $K_i$=current stiffness, lb/Amp, function of control current $G_p$=displacement sensitivity, V/in
$G_a$=power amplifier sensitivity, Amp/V
$C_p$, $C_i$, $C_d$=P, I, and D gains respectively
$\tau_i$, $\tau_d$=time constant of integrator and differentiator, respectively, sec.

Figure 6:
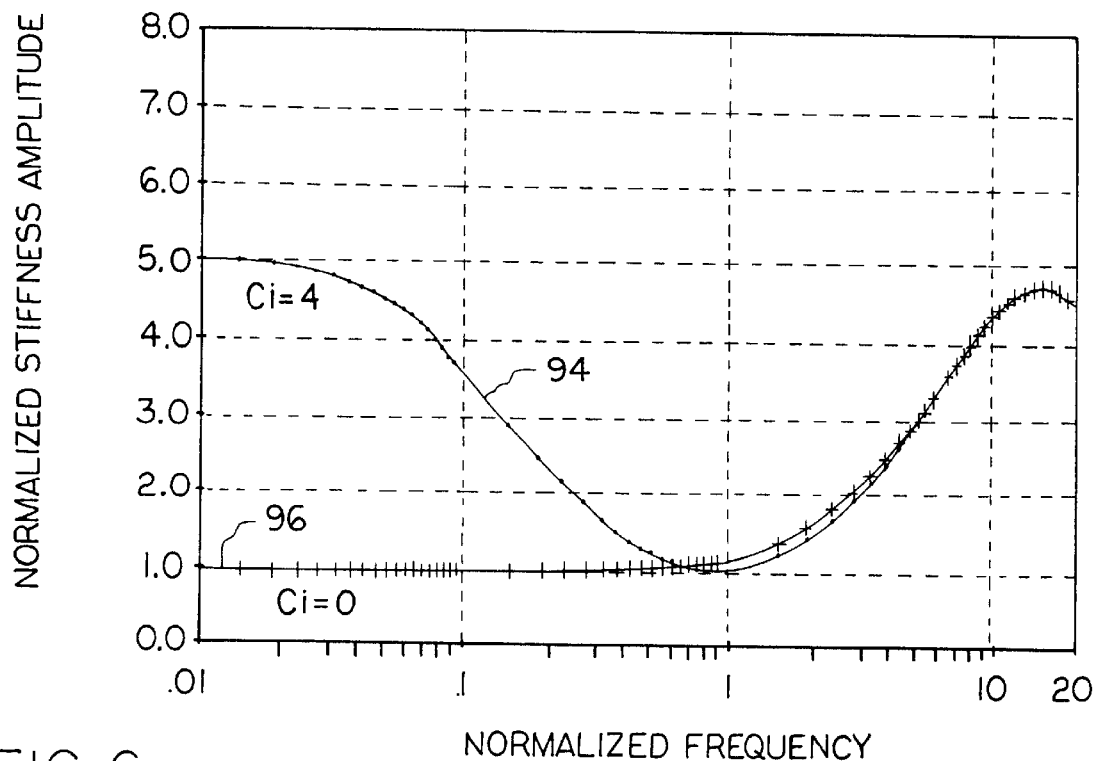
FIG. 6 is a representative graph of magnetic bearing normalized stiffness amplitude in relation to normalized frequency.
Figure 7:
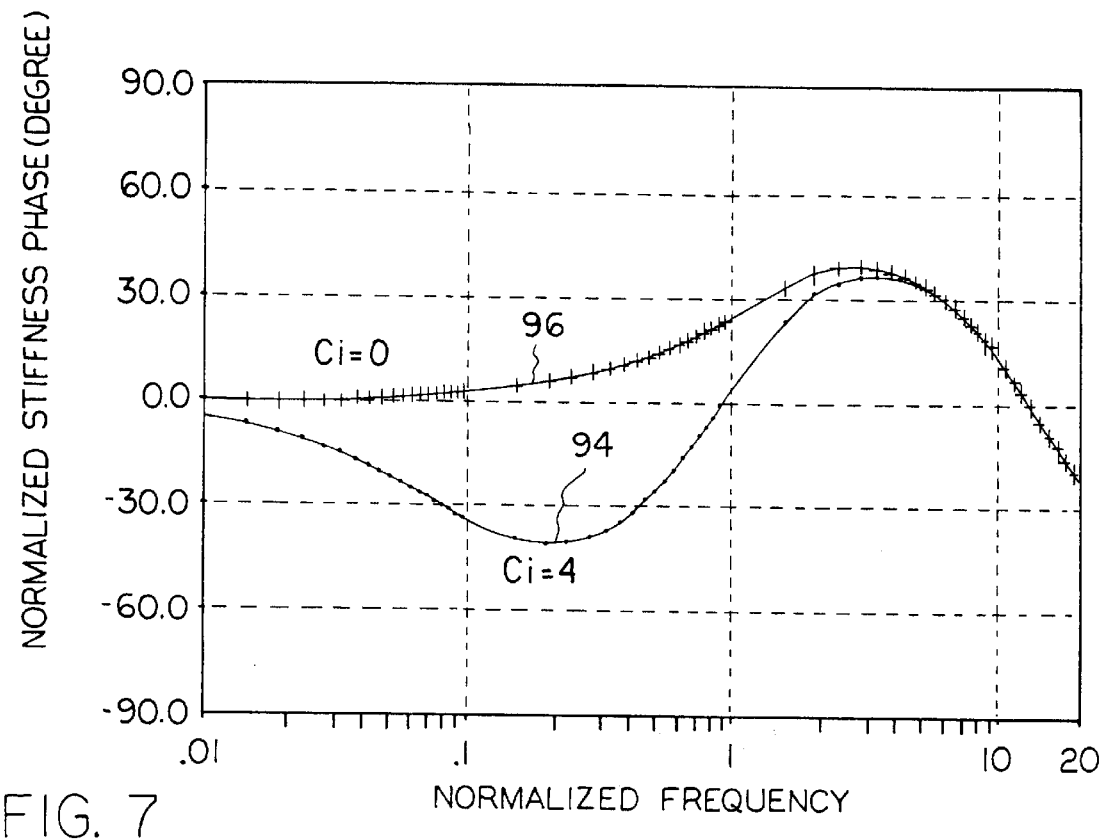
FIG. 7 is a representative graph of the corresponding phase angle for the graph of FIG. 6.

The above equation indicates that the magnetic bearing stiffness and damping can be varied by three gains and two time constants, i.e., proportional, integral, and derivative gains and the integrator and differentiator time constants. Suitable lead-lag or notch filter circuits, illustrated at 90, are, in accordance with the present invention, added in series with the PID controller 78 (to the output thereof) to provide gain and phase compensation at resonant frequencies not covered by the PID circuit 78. FIG. 6 is a graph of magnetic bearing stiffness amplitude at different normalized frequencies. In order to achieve the desired frequency response, the roll-off frequencies of the integrator and differentiator are set, for example, respectively at 0.1 and 10, and the roll-off frequency of the power amplifier 88, not included in the above equation, is set, for example, at 20. The graph shows one D.C. stiffness at 94 for an integrator gain of 4 and another at 96 for zero integrator gain. Thus, by varying the magnetic bearing D.C. stiffness, more or less load can be moved onto or off of the foil bearing 21, because varying the DC stiffness will change the running position of the rotor. While reducing stiffness so that the load can partially (or completely) be carried by the foil bearing part, it is important that the bearing system stability not be adversely impacted. One measure of bearing system stability is illustrated in FIG. 7, which shows the corresponding phase angle of the dynamic stiffness for the changes in integrator gain. A positive phase angle (damping) is indicative of stability at a given frequency. Since the phase angle is shown to be positive at the rotor critical frequencies, including rigid-body and bending modes, in the range between about 1 and 12 (normalized), this is thus indicative of rotor-bearing system stability. Magnetic bearing D.C. stiffness reduction may also be accomplished by reducing proportional gain.

It is the normal function of a purely magnetic bearing to keep the rotor centered, i.e., with its center at the bearing center, illustrated at 92. However, as seen in FIG. 4, wherein the line 98 generally connects the loci, illustrated at 100, of the rotor center at various loads for a 35 mm shaft in counterclockwise rotation and with 1.5 mil clearance, which is typical of foil bearings, the rotor center is generally at locus under static load and moves generally downwardly at an angle to the vertical of between about 20 and 30 degrees as load increases, as illustrated by arrow 104. The eccentricity locus in FIG. 4 indicates that a foil bearing may be loaded to an eccentricity ratio of 2 to 3. For a radial clearance of 2 mils, this translates into an operating eccentricity of 4 to 6 mils from the hybrid bearing center, assuming that the foil and magnetic elements are concentric. A magnetic bearing typically has a radial air gap of 20 to 30 mils. Therefore, the change in foil bearing operating eccentricity represents a large portion of the gap, and non-linearity of the magnetic bearing is expected. In order to handle such non-linearity and thus perform suitably for smooth load sharing and changes in load sharing as speed is increased and decreased, in accordance with the present invention, the steady state load sharing ratios are established throughout the speed range, i.e., all of the load taken by the magnetic bearing at lift-off, gradually changing the load sharing ratio as speed increases. Establishing the load sharing ratios is important because the dynamic properties of both the foil and magnetic bearings depend on their operating steady state load. However, first, the steady state load magnitude and direction as a function of speed should be determined.

Figure 8:
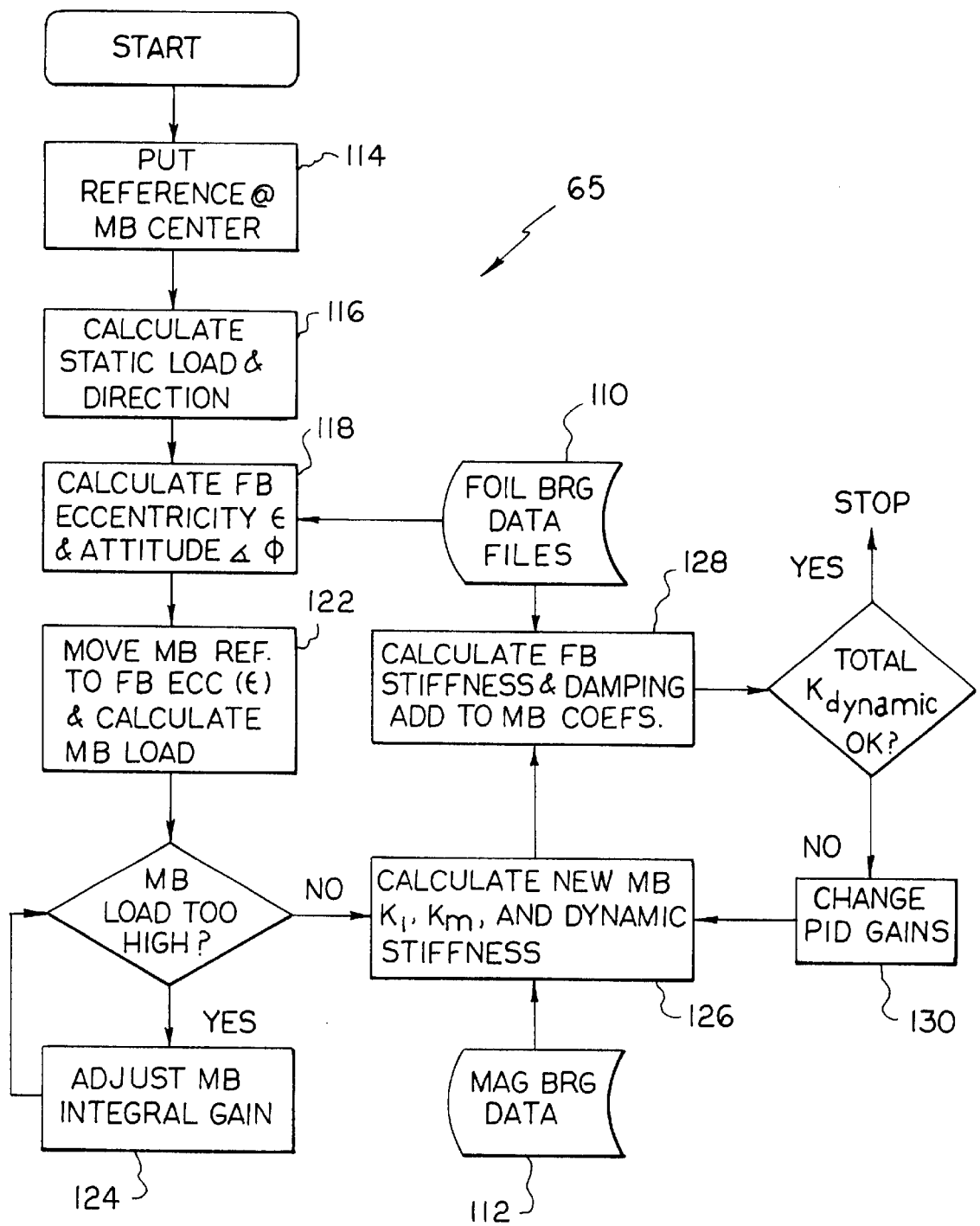
FIG. 8 is a load sharing flow diagram for the bearing.

Referring to the flow chart of FIG. 8, which may be considered to be a composite of design procedure and active control, there is shown generally at 65 in FIGS. 2 and 8 a supervising control circuit for determining the steady state load magnitude and direction as a function of rotor speed, wherein the foil and magnetic bearing part stiffnesses are continually re-calculated based on rotor speed, as illustrated at 67 and new reference eccentricities are continually re-calculated therefrom for input to summer 70, as illustrated at 69. The process is more specifically illustrated in FIG. 8. Thus, the foil and magnetic bearing data are stored in order to conduct the hereinafter described calculations, as illustrated at 110 and 112 respectively in FIG. 8. In accordance with the present invention, the reference point is put at the magnetic bearing center 92, as illustrated at 114, and, at each of the predetermined speeds at which load sharing is to be performed, determine the total static load and direction with the magnetic bearing taking all of the steady state load, as illustrated at 116. Using the stored data 110, determine the eccentricity and attitude angle of the foil bearing for a predetermined share of the load, as illustrated at 118. Then, move the magnetic bearing reference (which is the same as rotor center) to the calculated eccentric location, illustrated at 120 in FIG. 3, predicted by the foil bearing, and, once the rotor center has been so re-located, measure the currents in the magnetic bearing coils and the rotor true location, and calculate the steady state load actually supported by the magnetic bearing, as illustrated at 122. If necessary, the integral gains should be adjusted to make the steady state load sharing correct, as illustrated at 124. Then, using the stored magnetic bearing data 112, recalculate the current stiffness, magnetic stiffness (because both coil steady state currents and air gaps will have changed) and the dynamic stiffness as a function of excitation frequency according to the existing PID gains, as illustrated at 126. Next, using stored foil bearing data 110, calculate the stiffness and damping of the foil bearing for the steady state load, and add these dynamic coefficients to those of the magnetic bearing, as illustrated at 128. Then, check the adequacy of the total dynamic properties in terms of rotor stability, and, if these are not considered suitable, adjust the PID controller gains to improve them, as illustrated at 130. The stiffnesses of the foil and magnetic bearing parts are thus selected, as illustrated at 128 and 126 respectively, to allow the load sharing to successfully take place.

The following example of the above load sharing process is for illustrative purposes only and not for purposes of limitation. In accordance with this example, a hybrid foil-magnetic bearing has the following specifications:

|  | Foil part | Magnetic part |
| --- | --- | --- |
| Diameter (inches) | 4.0 | 4.0 |
| Length (inches) | 3.0 | 1.0 |
| Radial clearance (in.) | 0.002 | 0.0225 |
| Share of static load (lb.) | 21.0 | 14.0 |

The share of static load is desirably selected to be such as to minimize total bearing volume and weight as well as increase the load capacity of the bearing with a minimum of additional weight. The load sharing is performed at a rotor speed of, for example, about 10,000 rpm, which is selected because it is representative of expected operating conditions of, for example, a gas turbine engine rotor speed, and is in a speed region (low enough speed) where the foil bearing actively supports load and is thus useful. At this speed, the foil bearing non-dimensional data 110 are as follows:

| $\epsilon$ | $\phi$ | $W/P_a R^2$ | $K_{xx}/P_a R^2$ | $K_{xy}P_a R^2$ | $K_{yx}/P_a R^2$ | $K_{yy}/P_a R^2$ |
|---|---|---|---|---|---|---|
| .200 | 60.0 | .0975 | .389 | .437 | .105 | .309 |
| .400 | 46.0 | .2403 | .590 | −.658 | .187 | .620 |
| .600 | 32.0 | .4774 | .880 | −.819 | −.049 | 1.285 |
| .700 | 26.0 | .6466 | 1.041 | −.861 | −.172 | 1.699 |
| .800 | 20.0 | .8532 | 1.151 | −.842 | −.270 | 2.121 |
| .900 | 16.0 | 1.0951 | 1.295 | −.800 | −.342 | 2.498 |
| .950 | 15.0 | 1.2276 | 1.356 | −.765 | −.359 | 2.657 |

For the load of 21 lb., the foil bearing eccentricity, attitude angle, and stiffnesses are calculated by interpolation from the above table of non-dimensional data 110 to be as follows:

| $\epsilon$ | $\phi$ | $e$ | $e_x$ | $e_y$ |
|---|---|---|---|---|
| .4925 | 39.5 | .9851E − 03 | .6269E − 03 | −.7599E − 03 |

| $K_{xx}$ | $K_{xy}$ | $K_{yx}$ | $K_{yy}$ |
|---|---|---|---|
| .2173E + 05 | −.2197E + 05 | 2334. | .2783E + 05 |

Initially, the magnetic bearing is treated as supporting all of the 35 lb. (21.0 plus 14.0) static load, and its reference is set at X=Y=0, in accordance with step 114. The following magnetic bearing parameters are now obtained:

Initial bias currents: $I_{10}, I_{30}, I_{20}, I_{40}$ =

| Top | Bottom | Right | Left |
|---|---|---|---|
| 4.200 A | 3.000 A | 3.000 A | 3.000 A |

Now the rotor center as well as the magnetic bearing reference center are shifted to eccentric point 120 (FIG. 3), in accordance with step 122. With less load (i.e., 14 lbs.) to support by the magnetic bearing (the remainder of the 35 lb. load being supported by the foil bearing), the new magnetic bearing bias. currents, air gaps, and magnetic quadrant forces are calculated, in accordance with step 126, to be as follows:

$$I_4 = 3.084 \text{ A} \quad \begin{matrix} I_1 = 3.963 \text{ A} \\ I_3 = 3.237 \text{ A} \end{matrix} \quad I_2 = 2.916 \text{ A}$$

$g_1, g_2, g_3, g_4$ = .0233 .0219 .0217 .0231 (in)
$F_1, F_2, F_3, F_4$ = 59.22 36.27 45.22 36.27 (lb)

Figure 9:
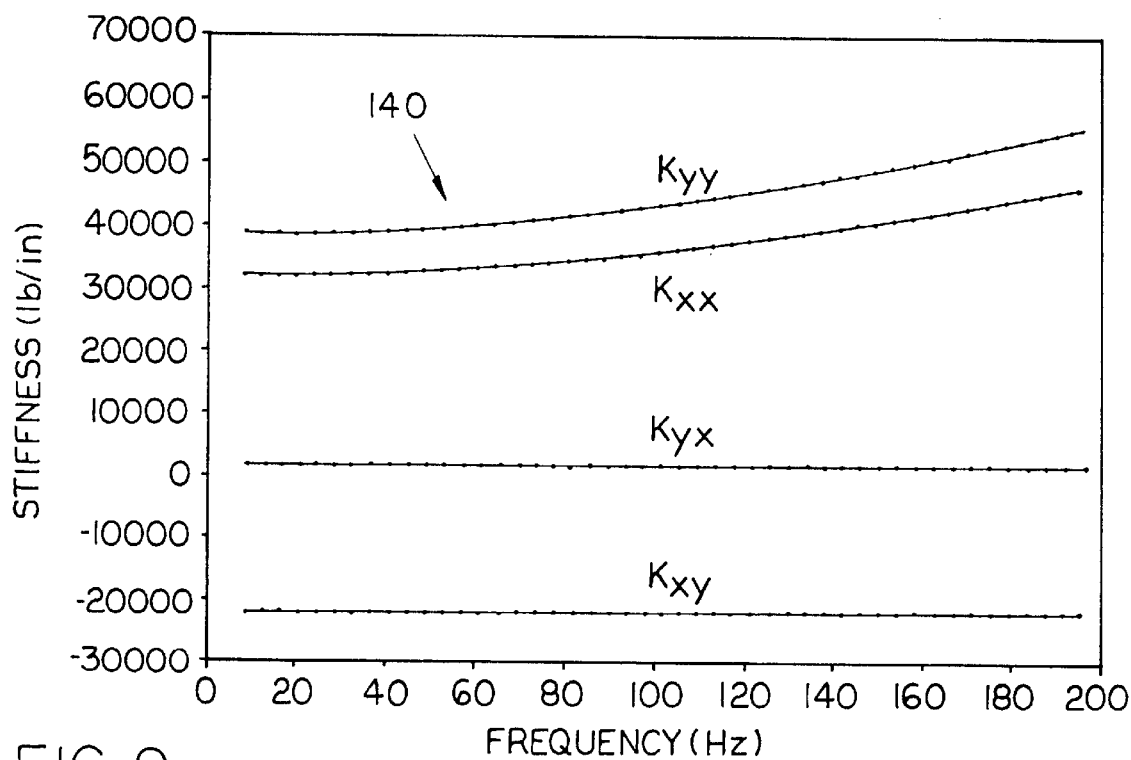
FIG. 9 is a representative graph of bearing stiffness coefficients relative to frequencies.
Figure 10:
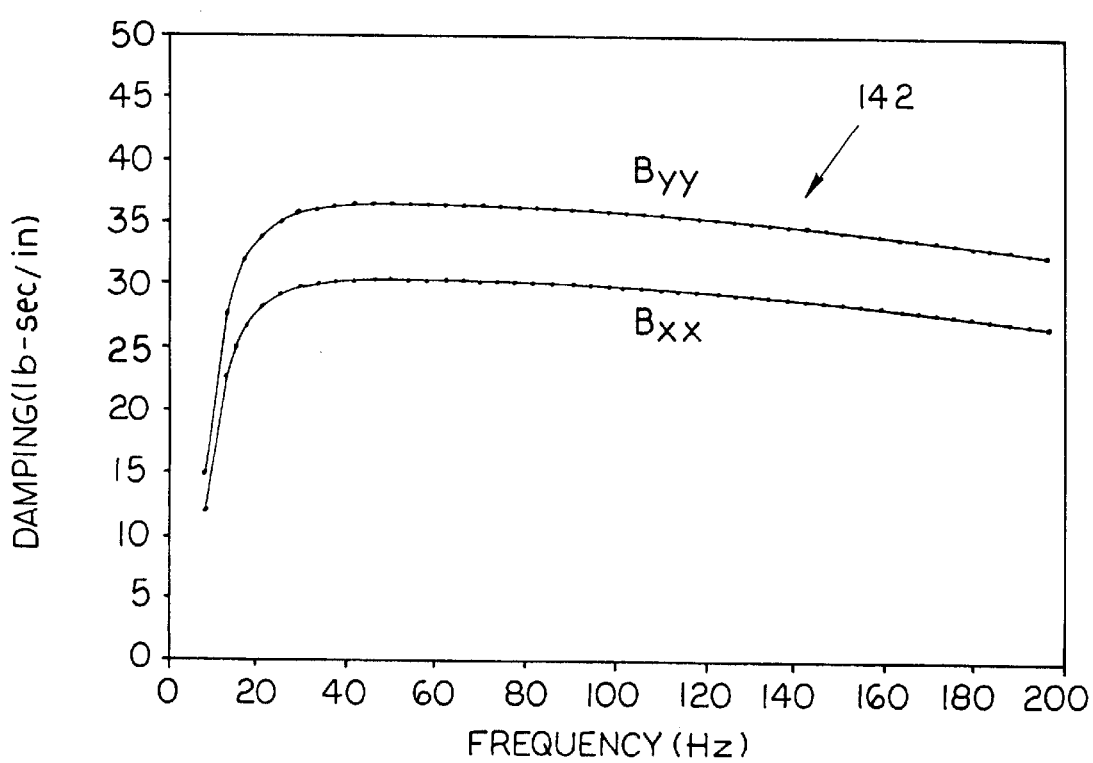
FIG. 10 is a representative graph of bearing damping coefficients corresponding to the bearing stiffness coefficients of FIG. 9.
Figure 11:
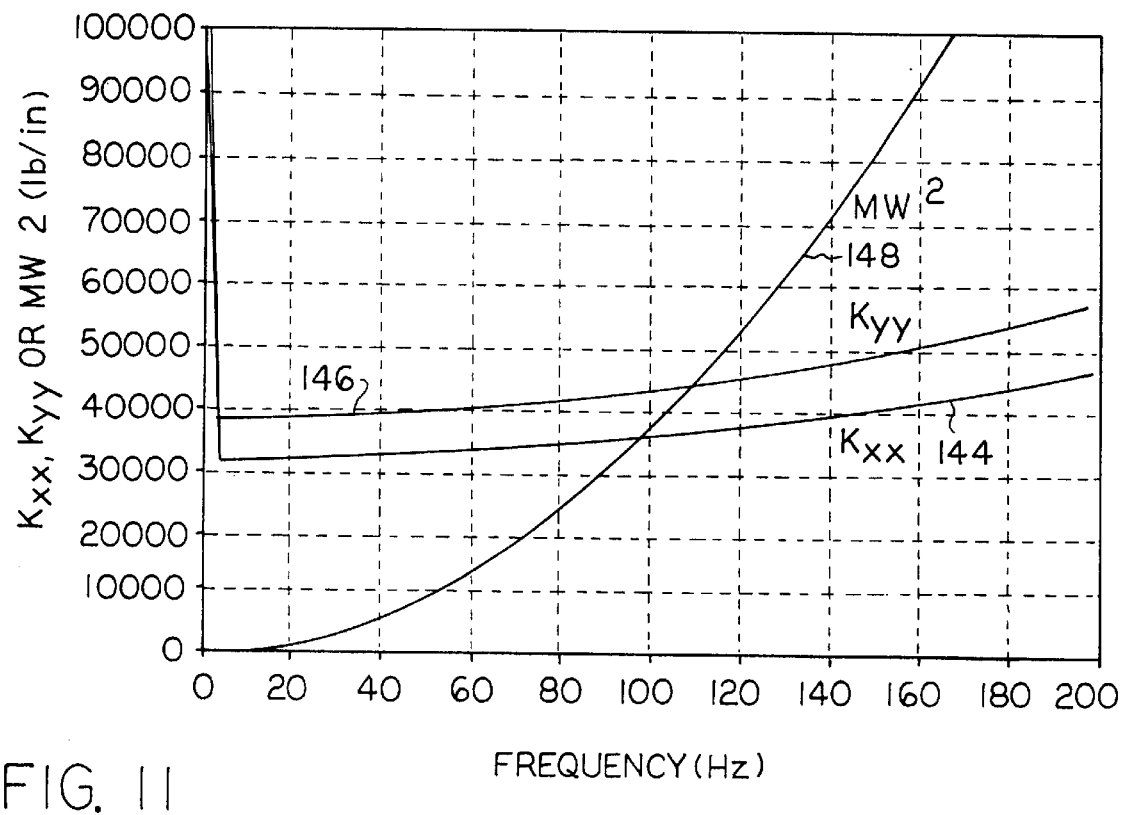
FIG. 11 is a representative graph illustrating the obtaining of the bearing natural frequencies.

Without changing the PID gains, the magnetic bearing stiffness and damping coefficients are calculated over a frequency range of 0 to 200 Hz. It should be noted that these coefficients are frequency dependent while those of the foil bearing are not. Adding the coefficients for the foil and magnetic bearings together, the stiffness and damping coefficients for the hybrid bearing are shown at 140 and 142 respectively in FIGS. 9 and 10 respectively. In accordance with step 130, in order to determine the bearing natural frequencies, Kxx, Kyy, and Mw2 are graphed, as illustrated at 144, 146, and 148 respectively in FIG. 11. As seen in FIG. 11, the intersection between Kxx and Mw2 is at 112 Hz. The rotor speed of 10,000 rpm or 167 Hz. is far above this natural frequency, and, therefore, the bearing stiffness and damping coefficients are considered to be acceptable. A more precise calculation of damped frequencies yields the following eigenvalues: −124±j629 and −241±j645 rad/sec. The corresponding modal frequencies are 100 and 103 Hz., not too far away from those derived from FIG. 11. It should be noted that the foil bearing damping has not been included in the above calculations since these two modes are reasonably damped, and more damping thereof can be achieved by adjusting the PID gains.

The present invention is not limited to the above load-sharing procedure. In an effort to provide a more simple means of controlling the bearing 20 so as to minimize the "thinking" necessary to control bearing performance, alternative means of controlling the hybrid bearing 20 may, for example, include predetermined speed dependent control schedules, prescribed rotor displacement limits, and an adaptive control method. Alternatively, the control of the hybrid bearing 20 may be accomplished through means that controls the magnetic bearing current according to a speed dependent gain-phase schedule such that the magnetic bearing takes less rotor load as a function of speed. This schedule would be implemented to match the increasing load capacity of the foil with increasing speed. Another embodiment may be that the control process be such that the rotor orbit and center position be maintained within prescribed limits and that the controller allow the foil bearing to carry as much load as possible while still operating within those prescribed limits. For example, the controller may restrict rotor position not to exceed 60% of the foil bearing operating clearance circle and that the rotor dynamic motions or orbit not exceed 30 to 40% of the foil bearing clearance circle. An adaptive control method may alternatively be employed, as described hereinafter with reference to FIG. 5. Thus, while operating at a particular speed the controller may be caused to reduce the magnetic bearing stiffness by reducing the electrical current so that the foil bearing carries a majority of the load and the shaft center finds its natural eccentricity position for the operating speed. From this eccentric position, the magnetic bearing stiffness (i.e., current) and load share are increased until the desired conditions are achieved. Combinations of the above control methods may be employed. For example, the control system may incorporate both the prescribed limits and the adaptive control method. In this system, the adaptive method may be used to determine the optimum operating conditions within the prescribed limits. These optimum conditions may be minimum control current, minimum dynamic orbit, or minimum vibrations at particular system natural frequencies. Load-sharing based on integral gain modification is described more specifically hereinafter with reference to FIGS. 20 and 21. Such alternative control means or procedures are meant to come within the scope of the present invention.

Figure 13:
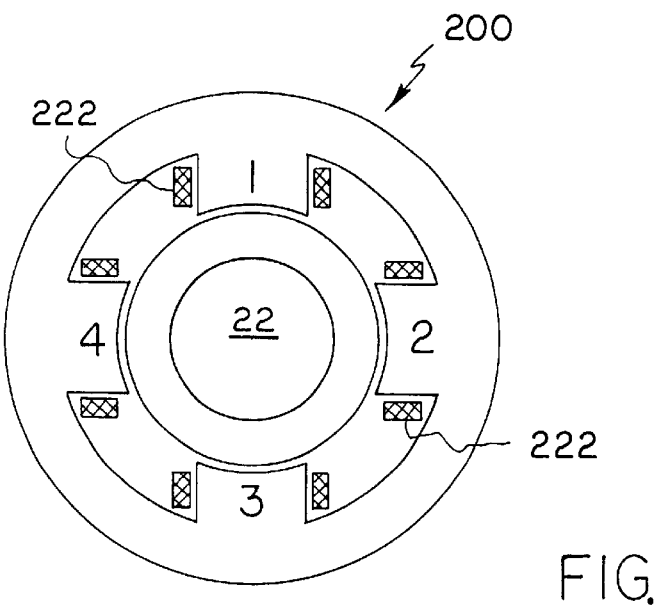
FIG. 13 is a schematic sectional view, taken along lines 13—13 of FIG. 14, of a hybrid foil-magnetic journal bearing in accordance with an alternative embodiment of the present invention.
Figures 14, 14A:
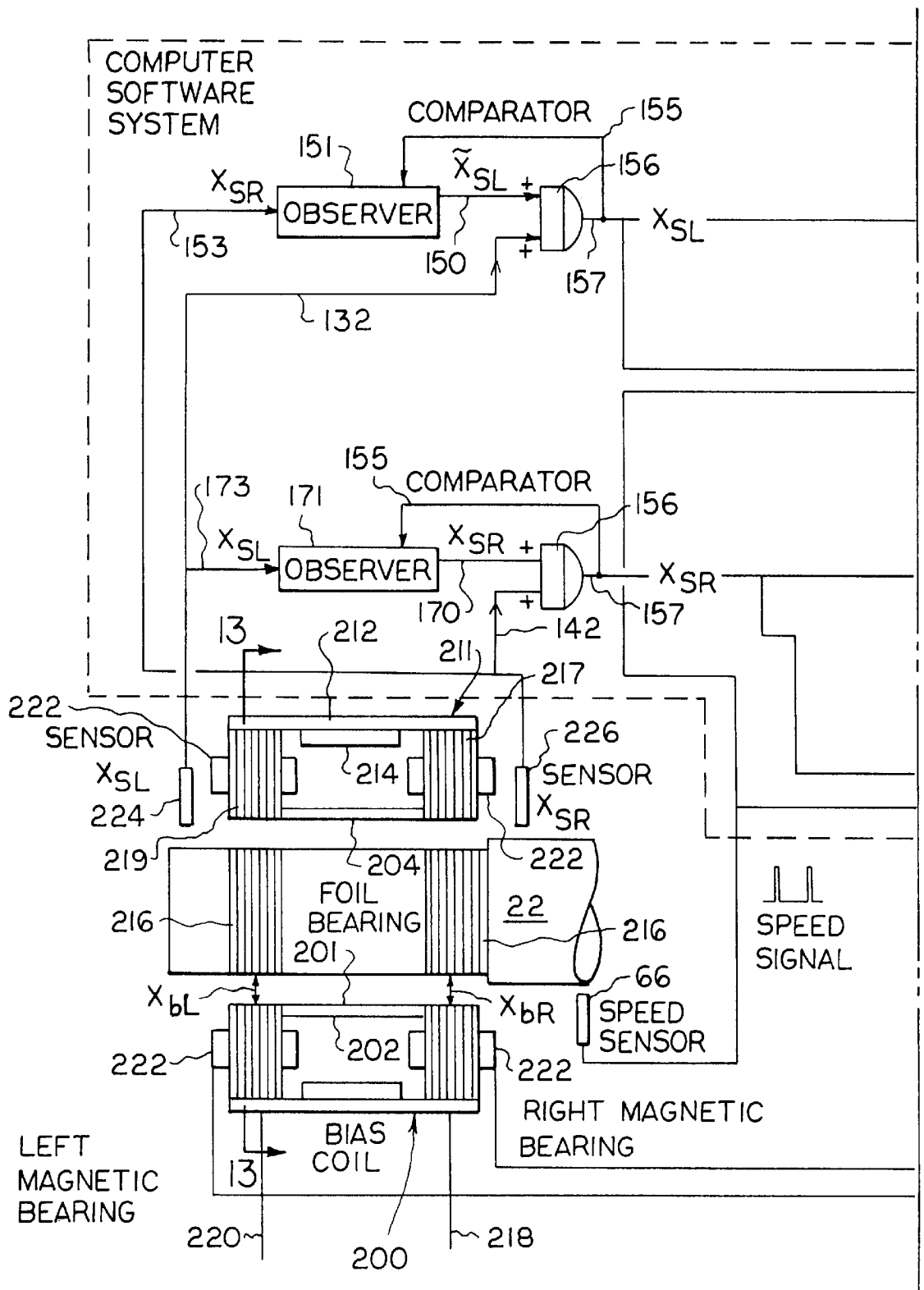
FIG. 14 is a schematic longitudinal sectional view of the bearing of FIG. 13 and illustrating a control system therefor in accordance with an alternative embodiment of the present invention.
Figure 14B:
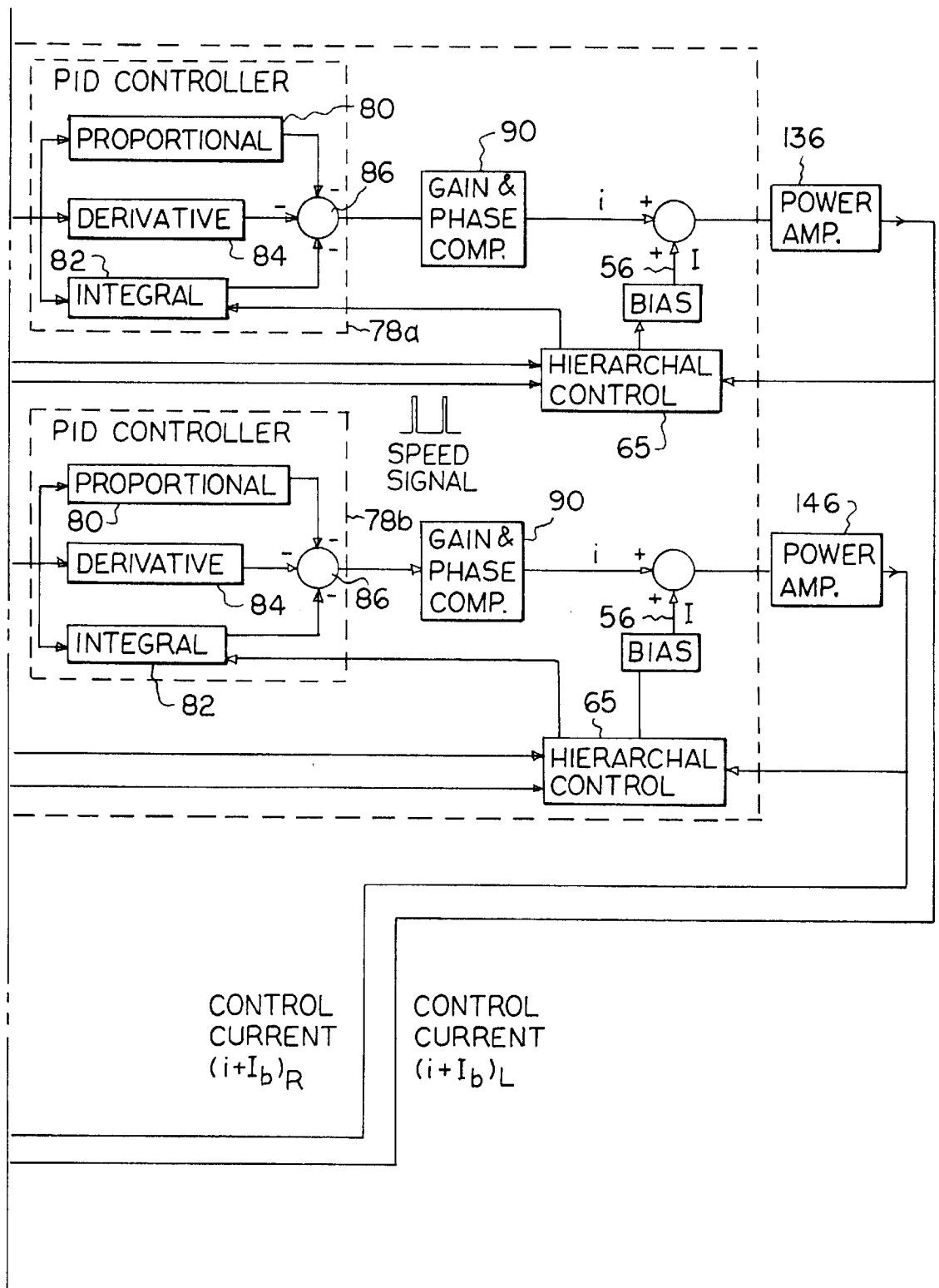

Referring to FIGS. 13 and 14, there is shown generally at 200 a hybrid foil-magnetic bearing having a foil bearing part 201 including a housing 202, a smooth thin flexible foil, illustrated at 204, for facing the rotor 22, and a corrugated sheet (not shown but similarly as illustrated at 34 in FIG. 1) for supporting the foil 204, the foil bearing part 201 being similar to the foil bearing part 21.

The foil bearing part 201 is nested within a homopolar active magnetic bearing part 211 comprising ferromagnetic material 212 about which is wound a bias coil 214 to form an electromagnet for interaction with ferromagnetic laminations 216 on the rotor 22, similarly as discussed for bearing part 51. This homopolar bearing part 211 has right and left side homopolar planes, illustrated at 218 and 220 respectively, and control coils 222 are provided on each plane 218 and 220.

In accordance with the present invention, the independently powered single bias coil 214 is provided for both bearing halves 217 and 219 (corresponding to bearing planes 218 and 220 respectively) located on opposite sides axially of the foil bearing part 201 to provide the basic magnetic flux required by both magnetic bearing halves 217 and 219 to thereby achieve reduced cost and complexity.

For a large load capacity, a foil bearing tends to have a length to diameter ratio close to one, which makes the hybrid bearing long in the axial direction and which therefore may result in a bending mode node inside the bearing. When a single rotor position sensor is used for each axis (vertical and horizontal) and the 4 coils (for example, those in quadrants numbered 1 and 3 in FIG. 13, both right and left for the vertical axis) are connected for push-pull control action, improperly phased forces with respect to rotor motion (sensor non-collocation) may be produced by the magnetic bearing actuator due to the sensor not being located directly adjacent to or in-line with the bearing axial center. In order to prevent or reduce the effects of sensor non-collocation while also providing improved reliability and control flexibility and the ability to control rotor system vibrations even when a rotor natural frequency node (location of very small amplitude relative to the bearing centerline) occurs within the axial length of the bearing, in accordance with the present invention, a pair of rotor position sensors 224 and 226 are provided for each of the left and right sides 220 and 218 respectively for the vertical axis (quadrants 1 and 3) and another pair of rotary position sensors (not shown) are provided for each of the left and right sides 220 and 218 respectively for the horizontal axis (quadrants 2 and 4), and the left and right bearing sides 220 and 218 for each of the vertical and horizontal axes are controlled independently by means of the respective sensors. The control circuitry for the horizontal axis is similar to that shown in FIG. 14 for the vertical axis, as described hereinafter. Thus, referring to FIG. 14, actual data received from sensor 224 for the vertical axis on the left side 220 of the bearing is sent via line 132 to a comparator 156 then (assuming for the moment no other input thereto) to the left side vertical PID controller 78a, where a suitable signal is generated, in accordance with the principles previously discussed, amplified by power amplifier 136, and sent to the pair of control coils 222 for quadrants 1 and 3 of the left bearing side 220 for exerting force along the left bearing side 220 for effecting movement of the rotor vertically. Similarly, actual data received from sensor 226 for the vertical axis on the right side 218 of the bearing is sent via line 142 to another comparator 156 then (assuming for the moment no other input thereto) to the right side vertical PID controller 78b, where a suitable signal is generated independently of the signal generated by controller 78a, in accordance with the principles previously discussed, amplified by power amplifier 146, and sent to the pair of control coils 222 for quadrants 1 and 3 of the right bearing side 218 for exerting force along the right bearing side 218 for effecting movement of the rotor vertically. Although an increased number of power amplifiers, sensors, and controllers is required, each independent bearing side control axis requires less power, and use of multiple power supplies/amplifiers advantageously provides redundancy in the system. Thus, even if one amplifier fails, the other bearing side for the same axis should remain active and energized. Total cost of the control system should be substantially less than double that of a system having a single sensor for an axis since smaller individual components should be less expensive.

A supervising or hierarchal controller 65 is provided for adjusting the load-sharing similarly as discussed with respect to FIG. 2.

In order to use both left and right bearing sensors for each axis in the control of both left and right magnetic bearing sides 220 and 218 respectively for enhanced system reliability, in accordance with a preferred embodiment of the present invention, the left side comparator 156 for each axis (vertical and horizontal) also receives an input via line 150 from observer 151, and, likewise, the right side comparator 156 for each axis also receives an input via line 170 from observer 171. The left side observer 151 receives an input of actual data from right side sensor 226 via line 153, and, likewise, the right side observer 171 receives an input of actual data from left side sensor 224 via line 173. Observer 151 is a suitable neural net system, commonly known to those of ordinary skill in the art to which this invention pertains, whose function is to predict and output a signal to respective comparator 156 via line 150 corresponding to predicted data of the left sensor 224 based on input via line 153 of actual data from the other or right sensor 226 and stored data of an analytical model of the system and of the feedback along respective line 155 of an accumulation of prior values of the respective comparator outputs along respective line 157 (representative of actual data from sensor 224). For example, the observer 151 may store in memory an accumulation of comparisons of signals along line 155 (representative of actual data from left sensor 224) and actual data from the other or right sensor 226 and predict, based thereon, the actual data from the left sensor 224 when given via line 153 the actual data from the other or right sensor 226. During normal operation as this comparison information is accumulated, the predictions by observer 151 of data from sensor 224 should approach the actual data from sensor 224 with the result that the feedback signals via line 155 should indicate only small differences between the predicted value (along line 150) and the outputted value (along line 157) of the data from sensor 224. As long as these differences are small (within a certain predetermined range), it can be assumed that the sensor 224 is given reliable data. Thus, if the difference is within the range, the respective comparator 156 is suitably programmed to output a signal along line 157 which is equal to the actual data from sensor 224, and the feedback thereof along line 155 will be added to the accumulated data from which the observer 151 in the future predicts the data from sensor 224. However, if the difference is outside the predetermined range (for example, the predicted value of data from sensor 224 via line 150 indicates a high rotor motion or displacement based on the actual data from the other sensor 226 yet the actual data from sensor 224 via line 132 indicates that the rotor is not vibrating), then it may be assumed (based on experience that when a sensor becomes inoperative, it shows no rotor motion) that the sensor showing no rotor motion has become inoperative in which case the comparator is programmed to accept and output along line 157 the predicted data from sensor 224 as provided by observer along line 150. The observer 171 and its comparator 156 are similar in operation to that described for observer 151 and its comparator 156. Thus, if the left sensor 224 for the left bearing side fails, a signal is generated from the data from the right bearing side sensor 226 that simulates the left bearing motion (as well as phase information) for delivery to the power amplifier 136 for control of the left bearing side 220. Generation of this observed and simulated time series data requires a priori knowledge of the rotor-bearing system dynamics. Thus, analytical predictions of the rotor bearing system performance are established during development of the system and stored in memory for use with the accumulated feedbacks through lines 155 for making the predictions.

It should be understood that, while the control system of FIG. 14 has been shown in connection with a nested configuration wherein the foil bearing part is nested within the magnetic bearing part, it may also be modified for use with a side-by-side configuration wherein separate magnetic bearing parts, whether homopolar or heteropolar, are located on opposite sides of the foil bearing part.

A control procedure may alternatively be provided which does not make control of the left and right magnetic bearing sides 220 and 218 respectively independent, wherein alternative methods for redundancy and/or improved rotor system performance may be influenced by each other. For example, during a change in unbalance due to rotor damage, it may be advantageous to allow the left side 220 of the bearing to be influenced by the right side 218 of the bearing to minimize total bearing loads, or, if the rotor is moving inside the bearing with both ends having the same phase relationship, only one sensor may be needed to control the rotor orbit.

Figure 16:
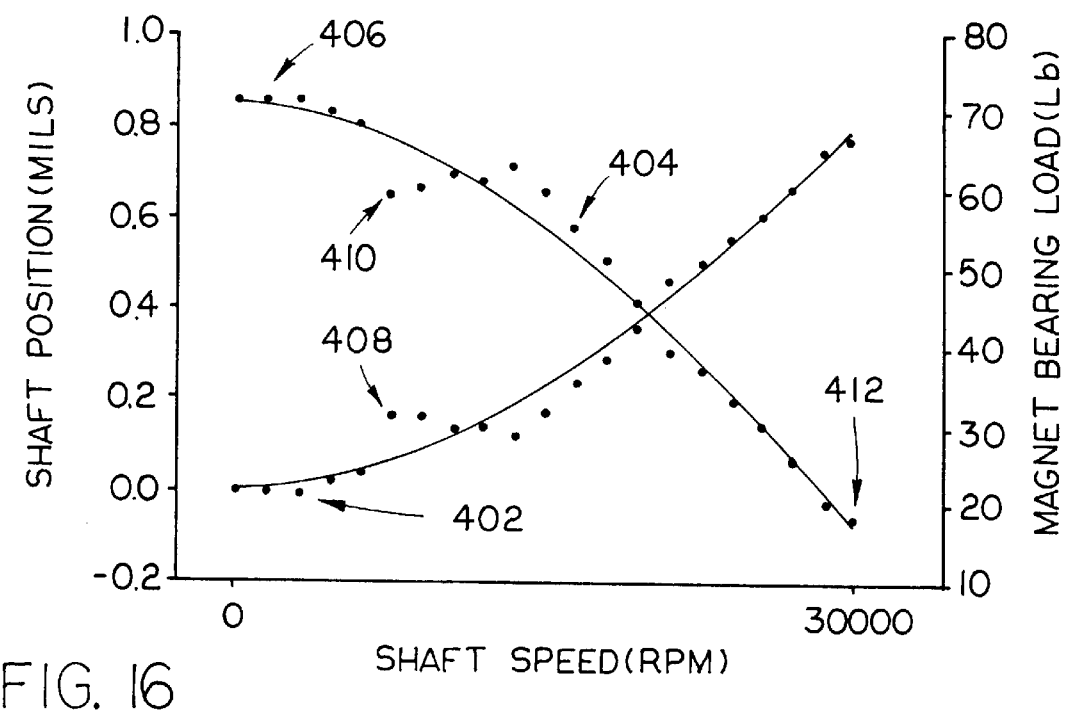
FIG. 16 is a graph of rotor position and of magnetic bearing load during rotor acceleration during a test of a hybrid bearing similar to that shown in FIG. 1.

FIG. 16 illustrates the results of a test to confirm that both the foil and magnetic parts of a hybrid bearing in accordance with the present invention support rotor loads. FIG. 16 shows both rotor vertical position at the magnetic sleeve, at 402, and magnetic bearing control force (which equates to load), at 404, while the rotor speed was increased from 0 to 30,000 rpm under a load of 80 pounds. At the start of the rotor acceleration, the magnetic bearing part is shown, as illustrated at 406 by the magnetic control force, to support almost the entire 80-pound load. As speed is increased and hydrodynamic pressures are generated in the foil bearing part, the rotor "lifts off" the top foil of the foil bearing part, as illustrated by the sudden change in rotor position and magnetic bearing force, as illustrated at 408 and 410 respectively. The almost constant magnetic force and rotor position for the next five data points, while not following the overall trend of decreasing magnetic force with speed may be due to sensor error or to the hydrodynamic pressures at rotor lift-off speed being small compared to the higher speeds, and the rotor may have only been supported intermittently by the hydrodynamic gas film pressures. After these intermediate 5 data points, the magnetic force is shown to continue to decrease to the point, illustrated at 412, that the magnetic bearing part is only supporting approximately 15 pounds of the total static and dynamic shaft load at 30,000 rpm. Similarly, the rotor vertical position is shown to follow a consistently increasing rise with speed. Thus, FIG. 16 is consistent with load-sharing by the foil and magnetic bearing parts of the hybrid bearing.

Figure 17:
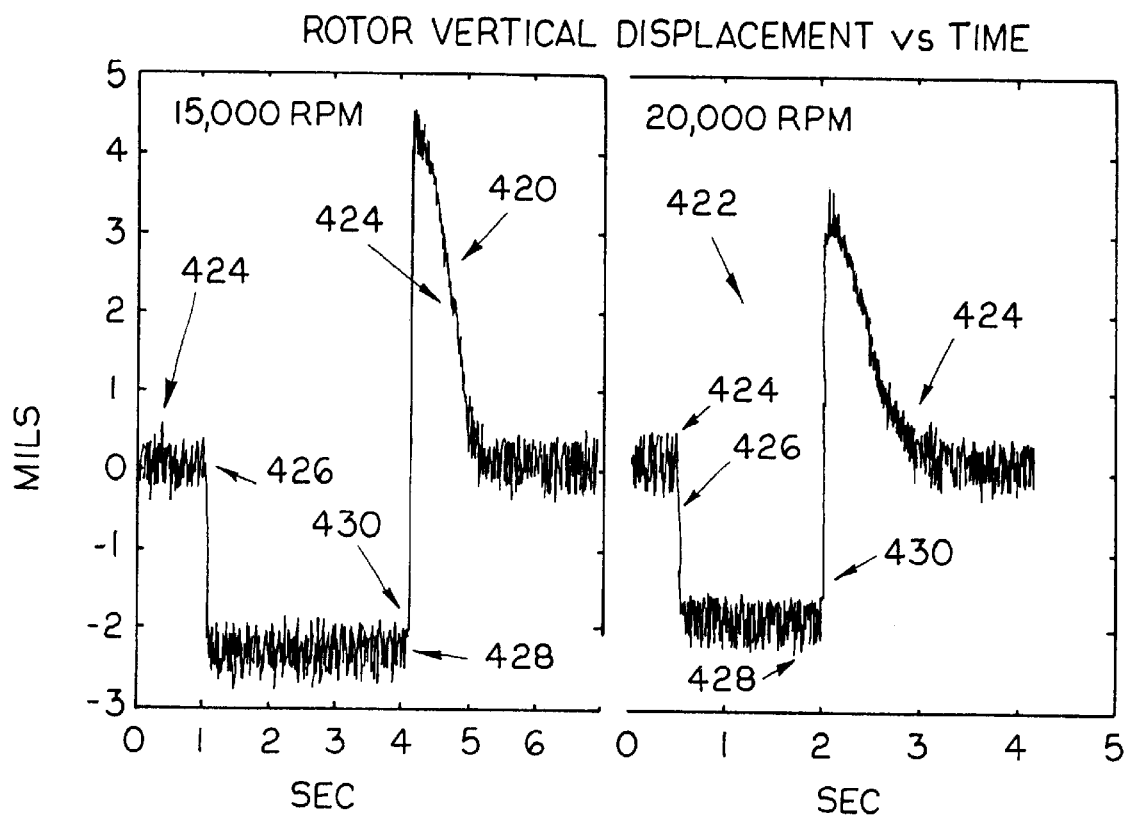
FIG. 17 is a graph showing rotor response during simulated failure of the magnetic bearing part of the hybrid bearing of FIG. 16 and recovery of the magnetic bearing part for return to hybrid bearing operation.

In the event that some component of the magnetic bearing part fails, electrical power is lost, or if transient loads exceed the load carrying capability of the magnetic beating part, the hybrid bearing must be able to continue to support the load. FIG. 17 shows the results of tests at 15,000 and 20,000 rpm, illustrated at 420 and 422 respectively, to confirm the ability of the foil bearing part to support the rotor during such transient events, wherein electromagnetic failures and recoveries were simulated. These lower speeds were used for the tests because they represent the more severe condition for the foil bearing part, i.e., the bearing load to be assumed by the foil bearing part is lower at lower operating speeds. Hybrid bearing operation wherein load is shared is illustrated at 424. At 426 is illustrated deactivation of the magnetic bearing part. At 428 is illustrated operation on the foil bearing part. At 430 is illustrated reactivation of the magnetic bearing part. It should be noted that the rotor excursions occurring during the deactivation and reactivation of the magnetic bearing part are less at 20,000 rpm than at 15,000 rpm. This further indicates confirmation that the foil bearing part supports greater loads at higher speeds. Thus, this test indicates confirmation of the capability of the foil bearing part to continue to support the rotor during transient events.

Figure 15:
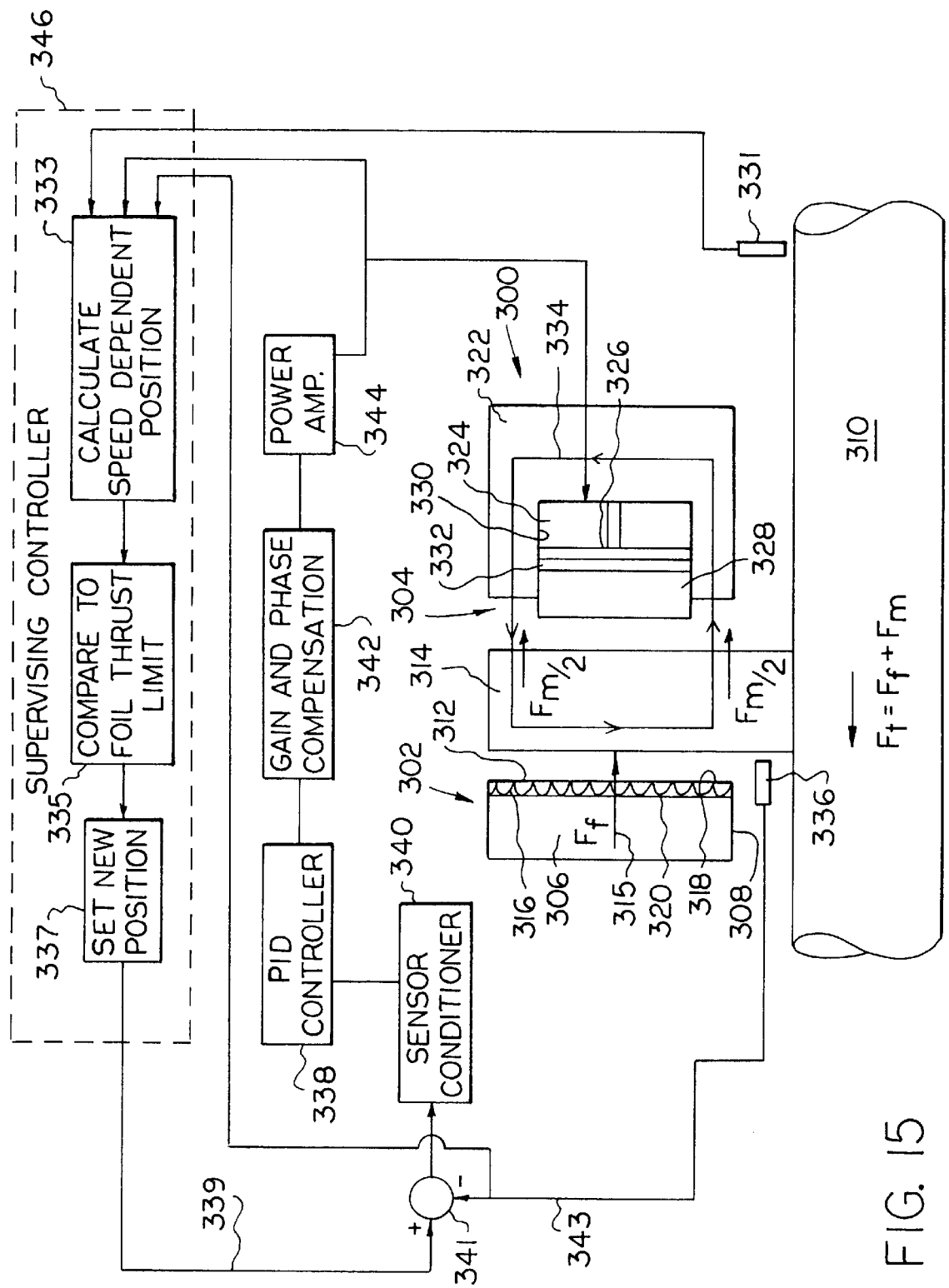
FIG. 15 is a schematic half longitudinal sectional view of a hybrid foil-magnetic thrust bearing in accordance with an alternative embodiment of the present invention.

Referring to FIG. 15, there is shown generally at 300 a hybrid foil-magnetic thrust bearing comprising a foil bearing part 302 and a magnetic bearing part 304. Such a bearing for high-speed and high-temperature applications advantageously carries more load per pound of bearing weight than a conventional active magnetic thrust bearing. Such a bearing also has superior dynamic characteristics, because the foil bearing part is inherently a high speed bearing and the magnetic bearing part with solid cores performs well at low frequencies, and the foil and magnetic bearing parts therefore complement each other. Advantageously, the foil coating is long-lasting since the foil bearing part does not take any load at start-ups. At high speeds, the foil bearing part can advantageously take over and prevent catastrophe in case of electric or control failures.

The foil bearing part 302 includes a generally cylindrical housing 306 having a central opening, illustrated at 308, in which the rotor 310 is received. A thin flexible smooth foil 312 is provided for facing the rotor runner 314 for bearing the thrust thereof. A corrugated sheet means 316 having alternating ridges 318 and valleys 320 is interposed between the foil 312 and housing 306 to bearingly support the foil 312 in its facing the runner 314 for receiving thrust load, as indicated by force Ff, illustrated at 315. The foil bearing part 302 may be constructed to various shapes and specifications depending on particular application for which it is to be used. For example, the corrugated sheet means 316 may comprise two or more sheets providing variable stiffness, similarly as the corrugated sheet means 34 of the journal bearing 20 of FIG. 1. Various alternative embodiments as well as a more detailed description of a suitable foil bearing part are disclosed in the aforesaid patents and applications incorporated by reference with respect to foil bearings.

The magnetic bearing part 304 includes a generally cylindrical core 322, composed of silicon steel or other suitable material and having a central opening for receiving the rotor 310. A coil means 324 is held in place in a notch 330 in the core 322 by a support structure 326 composed of a suitable non-magnetic material. A powder lubricated rub ring 328 for facing and taking physical contact with the rotor runner 314 to prevent direct contact or rubbing of the magnetic cores in case of over-load conditions is received in the notch 330 and protrudes slightly therefrom. Interposed between the rub ring 328 and the support structure 326 is a suitably stiff but damped material 332 for supporting the rub ring. The coil means 324 is supplied with bias and control currents, similarly as described for bearing 20, to effect magnetic interaction with the solid core ferromagnetic runner 314 to exert a flux field, illustrated at 334, which is variable by varying the control current, for bearing the runner 314, and receives input from a position sensor 336. A more detailed description of such a magnetic bearing is contained in the aforesaid patents and application referring to magnetic bearings.

The hybrid thrust bearing 300 utilizes a PID controller 338 along with a sensor conditioner 340, gain and phase compensator 342, and power amplifier 344 all similar to the PID controller 78, sensor conditioner 74, gain and phase compensator 90, and power amplifier 88 respectively of the hybrid journal bearing 20 for receiving thrust runner position input from the position sensor 336 and regulating control current to the magnetic bearing coil 322. At an operating speed, the foil bearing part 302 on one side of the thrust runner 314 takes part Ff of the total load Ft, and the magnetic bearing part 304 on the other side of the thrust runner 314 takes the remainder Fm of the total load Ft.

A supervising controller 346 is provided to effect the sharing of the thrust load to the maximum capacity of each of the foil and magnetic bearing parts and to maintain suitable dynamic properties (stiffness and damping) in accordance with the following discussion.

Assuming that the thrust load is smaller than Fm at start-up (which should normally be the case), the magnetic bearing part 304 takes all of the load and uses a high integral gain control to unload the foil bearing part at low control if necessary. At the operating speed, the load varies from a minimum or normal thrust load to a maximum due to, for example, a compressor surge. The load which can be assumed by the foil bearing part 302 is rotor speed dependent, that is, as the rotor speed increases, the foil bearing part 302 can assume greater thrust loads since thicker air films are generated by higher speeds, and it is thus desired that its share of the thrust load be increased with increased rotor speed. The supervising controller 346 is provided to continuously calculate, based on inputs of rotor speed as inputted thereto by sensor 331 or other suitable means, the runner position as inputted thereto by position sensor 336, magnetic force as inputted thereto from amplifier 344, and stored information as to desired amounts of load-sharing at various rotor speeds, a runner position relative to the foil bearing part for the respectively rotor speed, as illustrated at 333, i.e., the runner position at which it is considered that the bearing should operate optimally at the respective rotor speed. Force control (not to exceed the force capacity of the foil bearing part) may alternatively be provided. After comparing the new runner position to the foil thrust load limit and accordingly changing the runner position if necessary so that the foil bearing part is not overloaded, as illustrated at 335, the runner position is then set, as illustrated at 337, for delivery via line 339 to comparator 341 for comparing with the actual runner position signal obtained from position sensor 336 via line 343 to output a signal for delivery to the PID controller for suitably modifying the control current to the magnetic bearing part for movement of the thrust runner to the desired position for the particular rotor speed.

The function of the supervising controller 346 may include intelligent on-line decisions on gain adjustment according to the displacement, temperature, speed, and other measurements and may also include an initiation of a band-pass filter to eliminate synchronous axial vibration or a structure resonance excited by a blade-pass frequency source.

It may however be desirable that the hybrid thrust bearing 300 be able to take any load amount within its capacity and suitably share it without thinking (i.e., without the time consuming performance of off-line logic calculations and making decisions therefrom in the supervising controller 346 or otherwise) since there may not be enough time to do the "thinking." In other words, the load sharing should result from an in-line signal variation on the fly so the needed signal change is not slowed down by off-line calculations, somewhat akin to a natural reflex. In order to accomplish this, the following two conditions should be satisfied. Firstly, at the operating speed and under the foil bearing part capacity load Ff, the thrust runner should move to close the gap between itself and the foil bearing part by an amount no greater than emax. This defines the maximum axial deflection that the thrust runner may traverse at the hybrid bearing capacity load. Secondly, at the same time (i.e., without the necessity to "think"), the gap between the runner 314 and the magnetic bearing 304 is increased from a nominal value g0 to the maximum value g0+emax but should take its capacity load Fm. To satisfy the latter condition, the static deflection in the magnetic bearing part 304 should comply with the following relationship:

$$e_{max} \approx F_m/K_{dc}$$

and $$K_{dc} = K_i G_p G_a (C_p + C_i) - K_m$$

where $K_i$=current stiffness $K_m$=position stiffness $C_p$=proportional gain $C_i$=integral gain $G_p$=displacement sensor sensitivity $G_a$=power amplifier sensitivity.

The above equations indicate that if the static magnetic bearings stiffness is set too high in the hybrid bearing 300, the magnetic bearing part 304 may be flux-saturated before the foil bearing part 302 can share the load. Thus, it may be necessary to reduce the integral gain to a lower value after a start-up or foil lift-off.

Another magnetic bearing relation which should be satisfied is as follows:

$$F_m = f\{(I_b + \Delta I)/(g_0 + e_{max})\}^2$$

where f=magnetic force constant $I_b$=bias current $\Delta I$=additional steady state or DC current $g_0$=nominal magnetic air gap.

The amount of current Ib+delta I may be the design limit of the power amplifiers or the flux saturation current of the magnetic core material with the air gap g0+emax.

Figure 12:
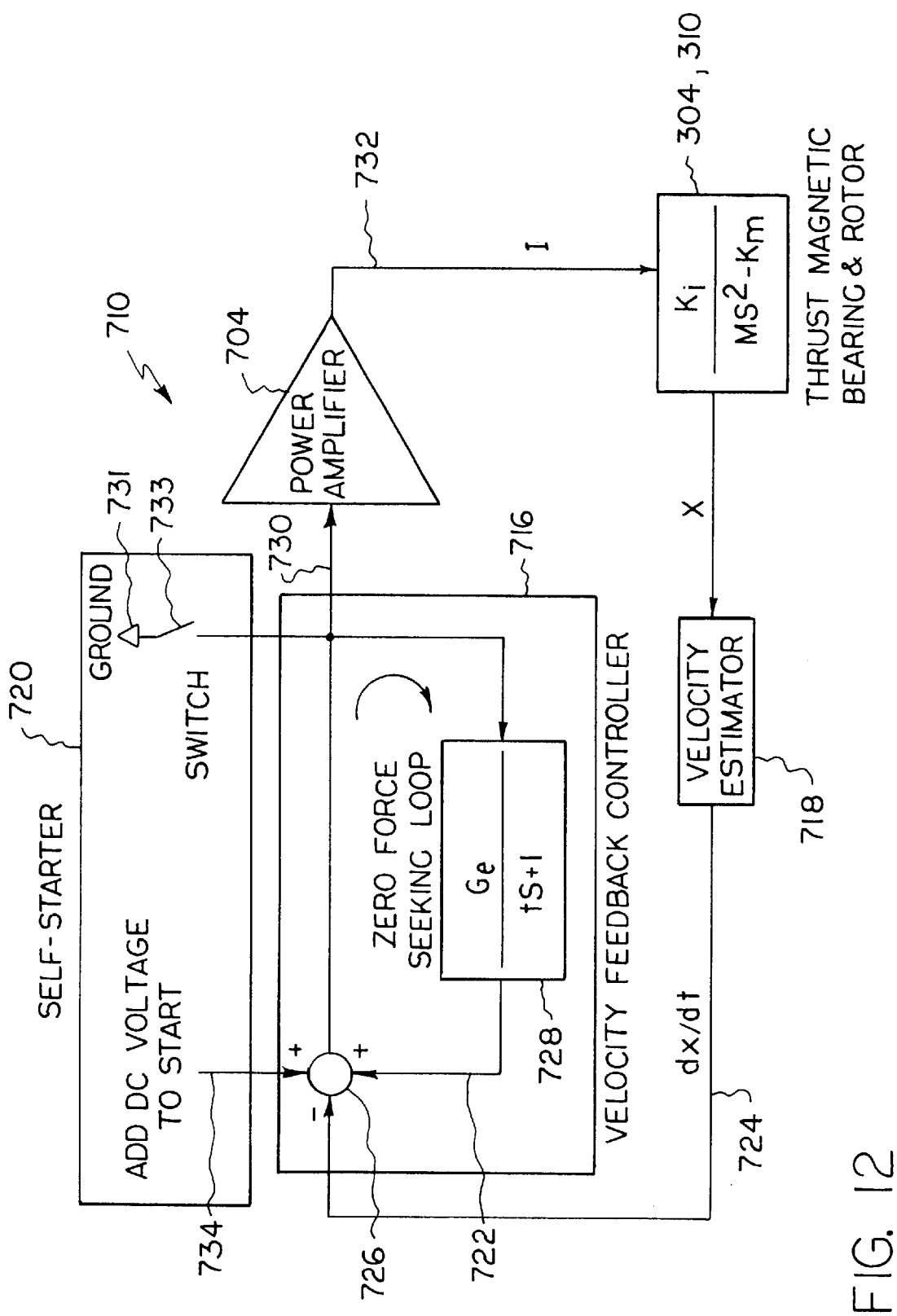
FIG. 12 is a schematic diagram illustrating a sensorless control circuit for either a journal or a thrust foil-magnetic hybrid bearing in accordance with an alternative embodiment of the present invention.

Referring to FIG. 12, in order to eliminate the supervisory controller 346 (as well as the PID controller) from the hybrid thrust bearing circuitry in order that load-sharing may be achieved without "thinking," as well as to provide a feedback control system for the hybrid thrust bearing which is inexpensive, robust, and reliable, the current to the magnetizing coils is controlled by velocity feedback control circuitry, illustrated at 710. Such a velocity feedback control system may also be provided for a hybrid foil-magnetic journal bearing. This circuitry, which may be called "sensorless" control since it does not utilize separate sensors such as a rotor position or a rotor speed sensor, involves three separable functions, namely, velocity estimation, self-start, and velocity feedback control. The sensorless control has to be initiated by a rotor motion. The self-start function is to provide this initial motion by injecting a current pulse into the coil 322. The current pulse in turn creates a force impulse to the rotor to kick it away from either the foil or the magnetic bearing part, whichever it is "leaning" against. The velocity controller will then grab and keep the rotor in the air gap. A distinctive feature of such a sensorless control is that the rotor settles in the magnetic air gap in a direction opposite to the direction of thrust load increase. The aforesaid U.S. patent application Ser. No. 09/046,334 discloses such a control system for a hybrid thrust bearing with reference to FIGS. 4 and 5 thereof.

Velocity feedback control is based on the existence of a static force equilibrium or balance position in the bearing clearance. This position serves as an axial displacement control reference. The velocity feedback circuitry 710 is provided to regulate the supply of current from amplifier 704 in order to create modulating magnetic forces to keep the rotor 310 at this position. The balance or equilibrium position may, for example, be slightly off to one side due to a static load applied on the rotor 310, assuming that the electromagnets are equally strong. When the static load changes, the rotor 310 will automatically (without "thinking") settle at a new balance position. The new balance position will, however, not be a stable one without the velocity feedback control provided by circuitry 710. This has been classically termed "unstable equilibrium." Its like balancing a vertical stick from one's hand; the bottom of the stick must be moved around to keep the stick standing up.

It should be emphasized that the active thrust bearing static stiffness is very different from, usually much higher than, its dynamic stiffness. In general, an active magnetic bearing stiffness is a function of excitation frequency.

The feedback control circuitry 710 comprises a velocity feedback controller 716 and a velocity estimator 718 in addition to the self-starter 720. See H. M. Chen (an inventor of the present invention), "Design and Analysis of a Sensorless Magnetic Damper," presented at ASME Turbo Expo, Jun. 5–8, 1995, Houston, Tex., 95GT180, as well as the aforesaid Chen patent. The velocity feedback controller contains a positive feedback loop 722 which may be called a zero force seeking loop. When the average rotor position is not at a static balance point, the rotor 310 will be accelerated toward one side, and the corresponding velocity signal outputted on line 724 from the velocity estimator 718 will show this one-sided effect, and this signal will be inputted to summer 726. The zero force seeking loop has a low pass filter, illustrated at 728, for detecting this acceleration, and, with its positive feedback, magnifying this effect. It then provides signals through lines 730, which are amplified by power amplifiers 704, and amplified corrective signals are then sent via lines 732 to the magnetizing coils.

In order to obtain an estimate of rotor velocity for input to velocity estimator 718 in a "sensorless" manner, the back EMF across the magnetizing coil means 322 and the signal of the current flowing through the coil 322 may be tapped, and the rotor vibration velocity recreated therefrom digitally or by analog means. The rotor axial velocity signal (dX/dt) inherently exists in the back EMF (E) of the thrust bearing magnetizing coil 322, i.e., as follows:

$$E = L(dI/dt) + (LI_b/g_0)(dX/dt) + IR$$

where

L=coil inductance

I=total current flowing through coil including bias current $I_b$

R=coil resistance.

By measuring E and I in the coil 322 and re-creating two voltage signals L(dI/dt) and IR, the velocity can be recovered using the above equation.

Since this "sensorless" method is sensitive to coil temperature which affects the copper wire electrical resistance, suitable search coils may be used to pick up the EMF and eliminate the current variation part of the signal. Alternatively, a velocity probe using a permanent magnet moving inside a coil may be used. Other suitable methods such as, for example, a search coil or a Hall-effect sensor for flux measurements for obtaining rotor velocity may be used.

Since the control circuitry 710 is activated by velocity, the rotor 310 at rest needs a "kick" to get the magnetic levitation started. Before "kicking" the rotor 310, it is necessary to know whether the rotor is resting or leaning on the foil or the magnetic bearing part. The "kick" should be in the direction to "free" the rotor 310. When the rotor 310 is at rest, the zero force seeking loop output is to ground, illustrated at 731, and the ground switch 733 is closed. To initiate a "start," a small DC voltage, with the correct sign for the direction in which the "kick" is to be made, is applied through line 734 to summer 726, and the grounding switch 733 is simultaneously opened. The zero force seeking loop 722 will then integrate this DC signal and demand a current, which will then be amplified by the amplifier 704, and the amplified current applied via the appropriate line 732 to the appropriate magnetizing coil to "shoot" the rotor 310 into the "air." The velocity feedback controller would then "grab" the rotor in the "air," so to speak. After the levitation, the DC voltage is then removed from line 734, and the "start" process is complete.

Since the bias flux is created with a permanent magnet, the thrust bearing part consumes essentially no power for maintaining the rotor substantially at the balance or equilibrium position. As in other conventional bearing-rotor systems, some amount of dynamic current may still be needed to counteract disturbances such as those due to unbalanced forces. For example, the power consumption may be less than about ½ watt compared to about 5 watts or more for conventional control systems.

Alternatively, the "smart" supervising controller 346 may include a sensorless magnetic thrust part, as described above, as a back-up for use in case of displacement sensor malfunction. See "Design and Analysis of a Sensorless Magnetic Damper", by H. M. Chen (one of the inventors of the present invention), presented at ASME Turbo Expo, Jun. 5–8, 1995, Houston, Tex., 95GT180.

To make a double-acting hybrid thrust bearing, an assembly which is a mirror image of the bearing 300 may be added to the rotor.

To provide load-sharing for the hybrid journal bearing 20 without "thinking," the rotor in the foil bearing part should be at an eccentricity emax at the operating speed and under the capacity load Wf. This defines the maximum clearance circle that the rotor may traverse at the hybrid capacity load. At the same time, the magnetic bearing part should take its capacity load Wm along one of the two identical but independently controlled axes (this being a conservative assumption because between-axes load capacity is the square root of 2 times Wm). To satisfy this condition, the static deflection in the magnetic bearing part should be $$e_{max} \approx W_m/K_{dc}$$

and $$K_{dc} = K_i G_p G_a (C_p + C_i) - K_m$$

where $K_i$=current stiffness $K_m$=position stiffness $C_p$=proportional gain $C_i$=integral gain $G_p$=displacement sensor sensitivity $G_a$=power amplifier sensitivity.

the above equations imply that the static magnetic stiffness Kdc can not be set too high in the hybrid bearing or the magnetic bearing part may be flux-saturated before the foil part can share the load. Therefore, the integral gain Ci should likely be reduced to a lower value after a start-up or foil lift-off. Another magnetic relation along the loaded axis is $$W_m = f\{(2I_b)/(g_0 + e_{max})\}^2$$

where f=magnetic force constant $I_b$=bias current with concentric air gap $g_0$=concentric magnetic air gap.

The above equation implies that each quadrant of the magnetic bearing part is provided with a bias current Ib when the rotor is placed concentrically in the bearing. When the rotor is at its maximum eccentricity, the loaded quadrant coil has a DC current 2Ib while the opposite quadrant bias current is reduced to zero (or a small positive value). The amount of current 2Ib may be the design limit of the power amplifiers or the flux saturation current of the lamination material with the air gap g0+emax.

Figure 18:
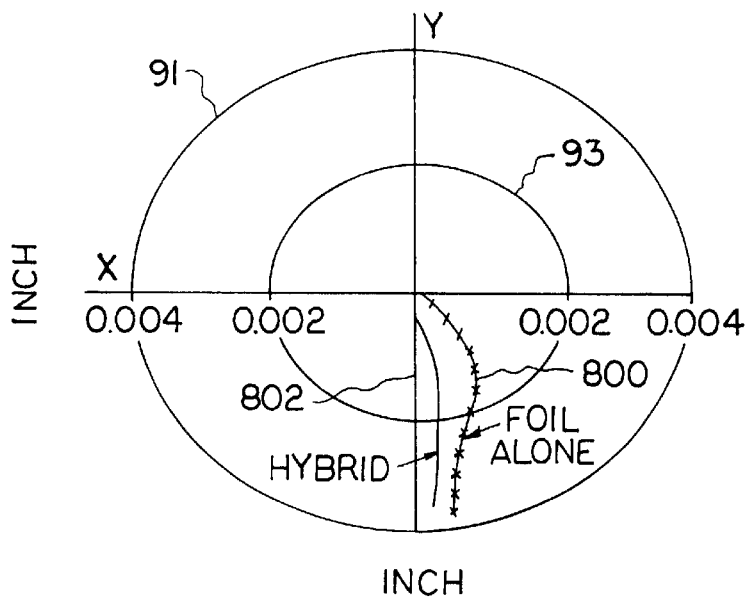
FIG. 18 is a graph similar to that of FIG. 3 illustrating differences in eccentricities between a foil journal bearing and a hybrid journal bearing as illustrated in FIG. 5.
Figure 19:
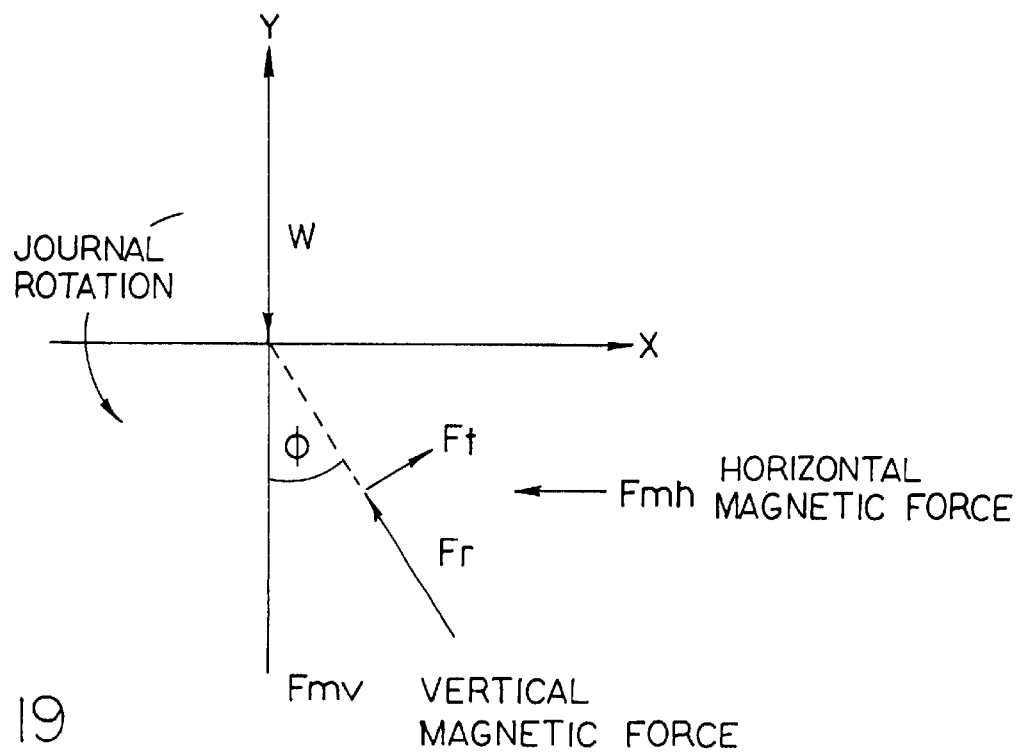
FIG. 19 is a graph for the purposes of explaining the differences in eccentricities illustrated in FIG. 18.

FIG. 18 illustrates at 800 a representative eccentricity locus of the hybrid bearing 20 compared with the locus, illustrated at 802, of the foil bearing part by itself. This illustrates that the hybrid locus 800 is being "squashed" by the horizontal force of the magnetic bearing part. Referring to FIG. 19, without the magnetic bearing part, the foil load W is balanced by the foil radial reactions Fr and tangential force Ft as in any fluid film bearings. With the magnetic bearing part, the horizontal magnetic reaction will force the vector set W,Fr,Ft to rotate in the anti-rotor-rotation direction by an angle delta theta, which is smaller than the altitude angle theta itself. Therefore, $$F_{mx} = -W \sin(\Delta\phi)$$

and $$W_l = W \cos(\Delta\phi) + F_{my}$$

where $$F_{mx} = f\{[(I_b+i_x)/(g_0-e_x)]^2 - [(I_b-i_x)/(g_0+e_x)]^2\}$$

$$F_{my} = f\{[(I_b+i_y)/(g_0+e_y)]^2 - [(I_b-i_y)/(g_0+e_y)]^2\}$$

$$e_x = e \sin(\phi-\Delta\phi)$$

$$e_y = -e \cos(\phi-\Delta\phi)$$

$$i_x = -G_p G_2 (C_p + C_i) e_x$$

$$i_y = -G_p G_2 (C_p + C_i) e_y$$

Figure 5:
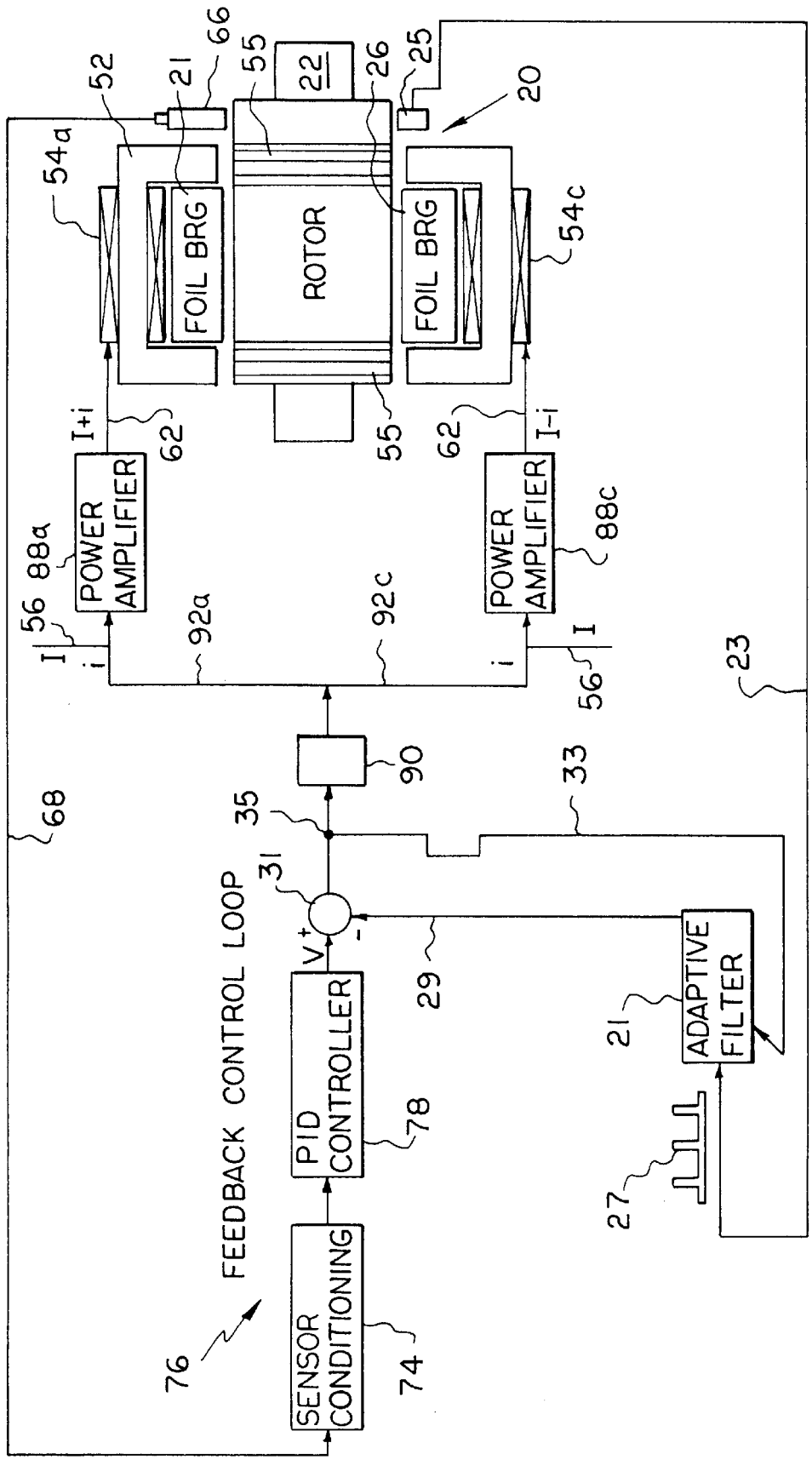
FIG. 5 is a schematic view, similar to that of FIG. 2, illustrating a control system for the bearing of FIG. 2 in accordance with an alternative embodiment of the present invention.

Referring to FIG. 5, there is shown the hybrid journal bearing 20 modified to eliminate the supervisory controller. Instead of the supervisory controller, in order that load-sharing may be achieved without "thinking," an adaptive filter 21, which may be a conventional tracking notch filter, which receives input via line 23 of rotor spin speed, as sensed by speed sensor 25 or other suitable means, as illustrated by square wave form 27 (one square wave per rotor revolution), and utilizes this input to continually re-set, on the fly and without "thinking,", the filter notch at the rotor spin speed for filtering from the input signal from the PID controller 78 to amplifiers 88a and 88b the rotor spin speed component thereof for delivery via line 29 to summer 31. The PID output signal is input to the adaptive filter after its passage through the summer 31 via line 33. Thus, the filtered signal (containing only the rotor spin speed component and, if desired, harmonics thereof up to, for example, the fifth harmonic) is sent to summer 31 with the result that the rotor spin speed component is canceled out, leaving components of the signal due to rotor misalignment, imperfections, and static components etc. for delivery to the amplifiers 88a and 88c. By extracting the rotor spin speed components of the signal, the synchronous response is forced to zero at point 35. By eliminating the components of the control voltage which are at the rotor spin frequency, the rotor is allowed to spin about its mass center of gravity (commonly known as "virtual balancing") instead of its geometric center thereby using less energy while reducing housing vibrations, and load sharing will occur by maintaining some softness (reduced magnetic stiffness) in the magnetic bearing part so that the control current need not be re-calculated at different rotor spin speeds and, thus, so that load sharing may be achieved quickly without "thinking."

Figure 20:
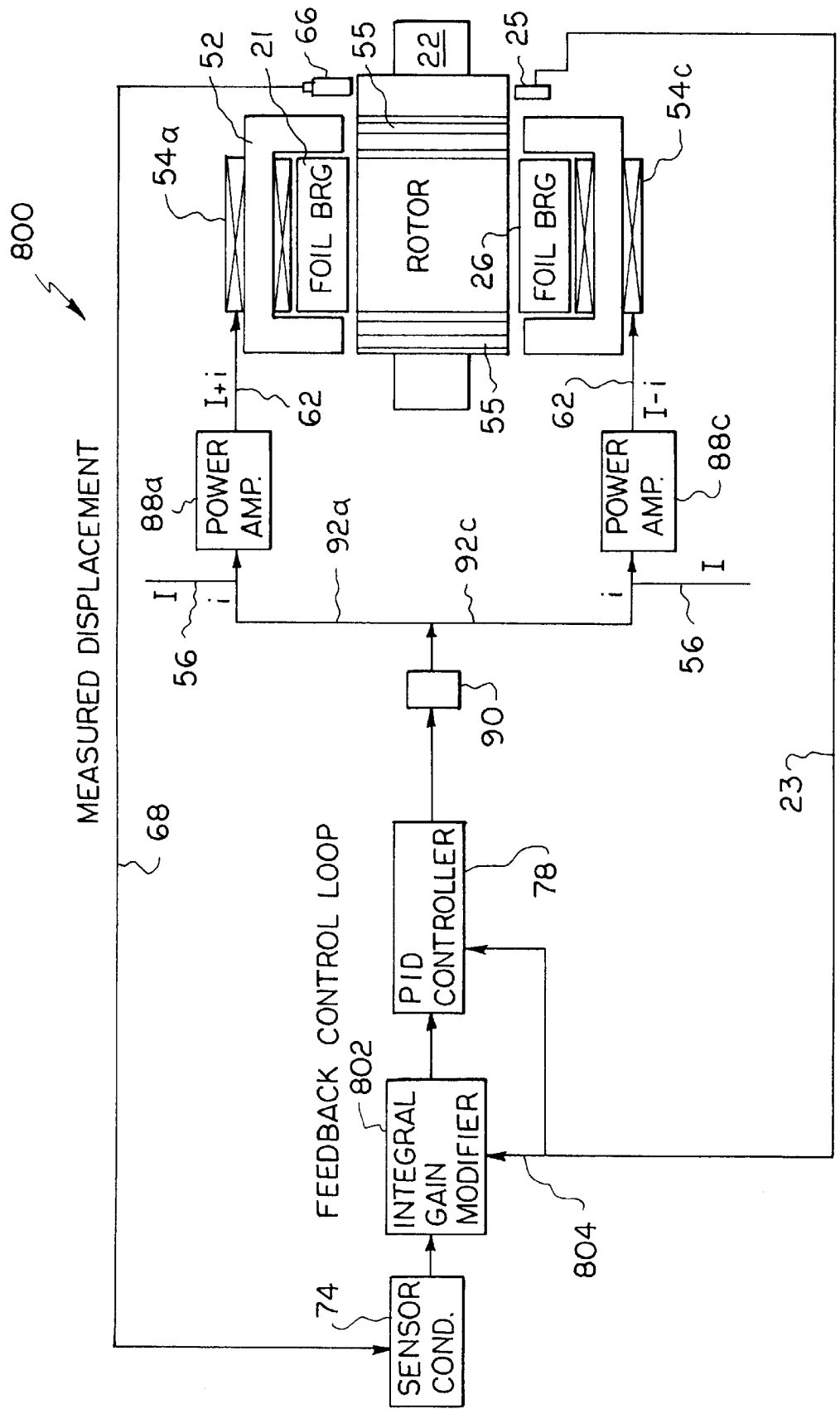
FIG. 20 is a schematic view similar to that of FIG. 2 of another alternative embodiment of the control system for a hybrid foil-magnetic journal bearing.
Figure 21:
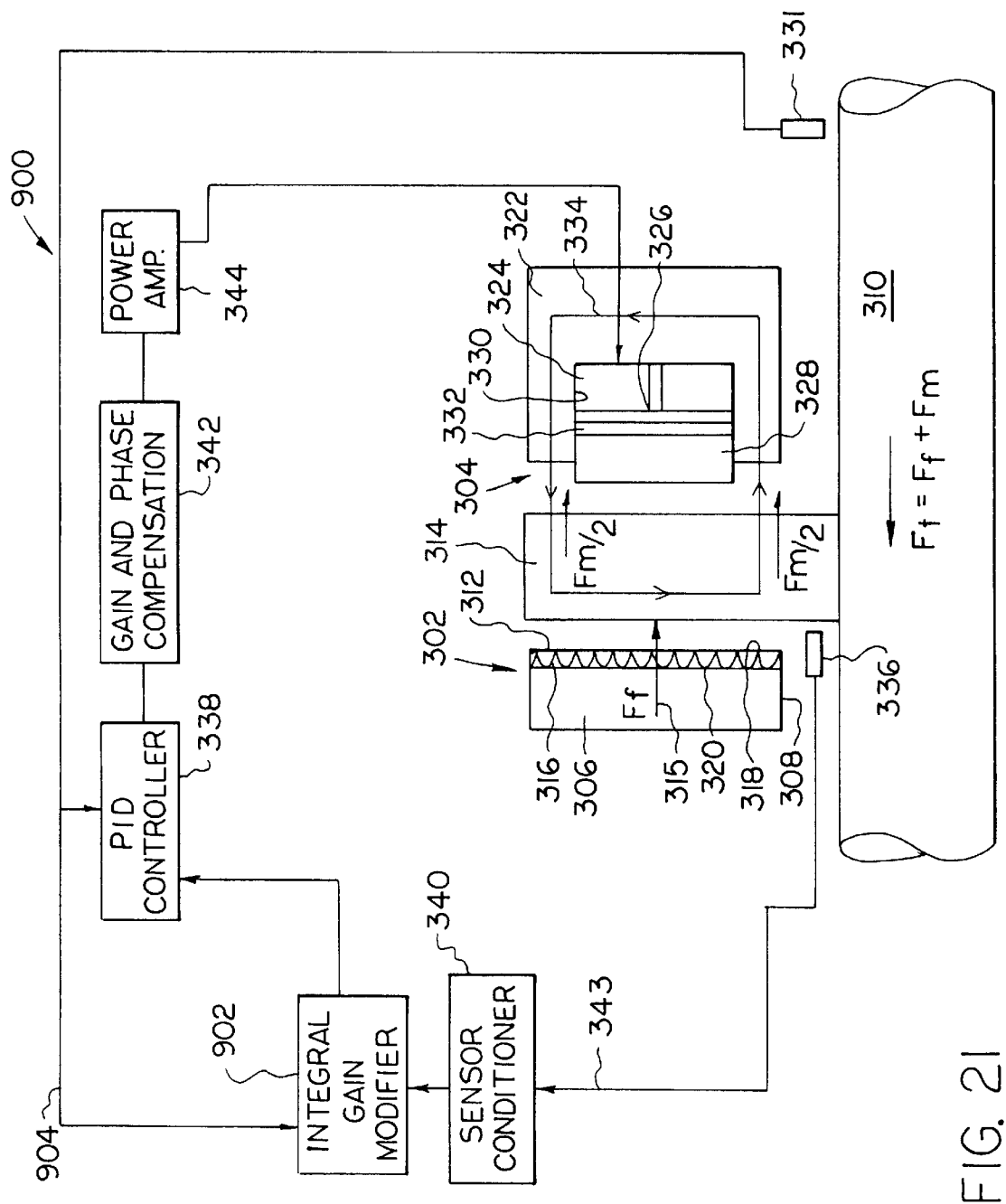
FIG. 21 is a schematic view similar to that of FIG. 15 of another alternative embodiment of the control system for a hybrid foil-magnetic thrust bearing.

FIGS. 20 and 21 illustrate at 800 and 900 respectively alternative embodiments of the control systems for the hybrid foil-magnetic journal and thrust bearings respectively shown in FIGS. 2 and 15 respectively, wherein the bearing and control components are similar respectively except as shown and described herein. In order to eliminate the supervising controller so that load-sharing may be achieved quickly without "thinking," in accordance with a preferred embodiment of the present invention, the integral gain of the input to the PID controller is decreased, preferably gradually, at operating speed and preferably at speeds leading up to operating speed so as to reduce the static stiffness thereby allowing some of the load to be assumed by the foil bearing part at these higher speeds.

Referring to FIG. 20, a suitable means, illustrated at 802, for modifying the integral gain or integral control coefficient is provided for the input to the PID controller 78. Modification of the integral control coefficient and means for doing so are within the knowledge of those of ordinary skill in the art to which this invention pertains. The integral gain modifier 802 is responsive to signals, via line 804, of rotor spin speed from sensor 25. Thus, at predetermined rotor spin speed or speeds, such as operating speed, at which it is desired that the foil bearing part share the load, the integral control coefficient is reduced (for example, gradually as speed is increased), and, as speed is reduced, the integral control coefficient is accordingly reduced so that the magnetic bearing part assumes all of the load again at shut-down. The integral control coefficient is reduced in order to reduce the magnetic bearing part static stiffness so as to allow "seeking" of the foil bearing part eccentric center at the particular speed whereby load-sharing may be achieved quickly without "thinking."

Referring to FIG. 21, a suitable means, illustrated at 902, for modifying the integral gain or integral control coefficient is provided for the input to the PID controller 338. The integral gain modifier 902 is responsive to signals, via line 904, of rotor spin speed from sensor 331. Thus, at predetermined rotor spin speed or speeds, such as operating speed, at which it is desired that the foil bearing part share the load, the integral control coefficient is reduced (for example, gradually as speed is increased), and, as speed is reduced, the integral control coefficient is accordingly increased so that the magnetic bearing part assumes all of the load again at shut-down. The integral control coefficient is reduced in order that, regardless of rotor speed, the control current will not need to be re-calculated at different rotor speeds and, thus, so that load-sharing may be achieved quickly without "thinking."

It should be understood that, while the present invention has been described in detail herein, the invention can be embodied otherwise without departing from the principles thereof, and such other embodiments are meant to come within the scope of the present invention as defined by the appended claims.

What is claimed is:

1. A method for bearing a rotor portion comprising sharing rotor portion load between a foil bearing part and a magnetic bearing part without using a calculated rotor trajectory corresponding to various rotor spin speeds and further comprising controlling power input to the magnetic bearing part in response to feedback of rotor position, wherein the step of sharing load comprises modifying the power input in response to rotor spin speed to reduce load capacity of the magnetic bearing part as rotor spin speed is increased and increase load capacity of the magnetic bearing part as rotor spin speed is decreased.

2. A method according to claim 1 wherein the step of sharing load comprises outputting, in response to input of rotor portion radial position from a first sensor on a first side of a housing for the foil and magnetic bearing parts, a signal to a first control coil for regulating amount of flux on the first side of the housing and further comprises outputting, in response to input of rotor portion radial position from a second sensor on a second side of the housing, a signal to a second control coil for regulating amount of flux on the second side of the housing.

3. A method for bearing a rotor portion comprising sharing rotor portion load between a foil bearing part and a magnetic bearing part without using a calculated rotor trajectory corresponding to various rotor spin speeds and further comprising controlling power input to the magnetic bearing part in response to feedback of rotor position, wherein the step of sharing load comprises modifying the power input in response to rotor spin speed to reduce load capacity of the magnetic bearing part as rotor spin speed is increased and increase load capacity of the magnetic bearing part as rotor spin speed is decreased, wherein the step of modifying power input comprises reducing integral gain of input to a controller for controlling the power input as the rotor spin speed is increased and increasing integral gain of the input to the controller as the rotor spin speed is decreased.

4. A method for bearing thrust of a rotor comprising disposing foil and magnetic bearing parts on opposite sides axially respectively of a portion of the rotor for bearing thrust, controlling power input to the magnetic bearing part in response to feedback of rotor axial position, and sharing on the fly rotor portion thrust load between the foil bearing part and the magnetic bearing part, wherein the step of sharing thrust load comprises modifying the power input in response to rotor spin speed to reduce load capacity of the magnetic bearing part as rotor spin speed is increased and increase load capacity of the magnetic bearing part as rotor spin speed is decreased.

5. A method according to claim 4 wherein the step of modifying power input comprises reducing integral gain of input to a controller for controlling the power input as the rotor spin speed is increased and increasing integral gain of the input to the controller as the rotor spin speed is decreased.

6. A method according to claim 5 further comprising continually deriving a signal of rotor portion velocity from back EMF or flux of a magnetizing coil of the magnetic bearing part, and passing the signal through a zero force seeking loop to provide signals to the magnetizing coil for continuously returning the rotor portion to an equilibrium position.

7. A method for bearing a rotor portion comprising sharing rotor portion load between a foil bearing part and a magnetic bearing part without using a calculated rotor trajectory corresponding to various rotor spin speeds and further comprising controlling power input to the magnetic bearing part in response to feedback of rotor position, wherein the step of sharing load comprises modifying the power input in response to rotor spin speed to reduce load capacity of the magnetic bearing part as rotor spin speed is increased and increase load capacity of the magnetic bearing part as rotor spin speed is decreased, wherein the step of modifying power input includes inputting rotor spin speed to an adaptive filter to continually reset the adaptive filter at the rotor spin speed as the rotor spin speed is changed.

* * * * *